United States Patent
Kato et al.

(10) Patent No.: US 9,428,179 B2
(45) Date of Patent: Aug. 30, 2016

(54) POWER TRANSMISSION DEVICE FOR A HYBRID VEHICLE AND HYBRID SYSTEM

(75) Inventors: Shunya Kato, Seto (JP); Atsushi Tabata, Okazaki (JP); Tatsuya Imamura, Okazaki (JP); Tooru Matsubara, Toyota (JP); Takeshi Kitahata, Toyota (JP); Kenta Kumazaki, Toyota (JP); Yasuhiro Hiasa, Nagoya (JP); Hiroyuki Shioiri, Numazu (JP); Hiroyuki Shibata, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/409,862

(22) PCT Filed: Jun. 19, 2012

(86) PCT No.: PCT/JP2012/065660
§ 371 (c)(1),
(2), (4) Date: Dec. 19, 2014

(87) PCT Pub. No.: WO2013/190642
PCT Pub. Date: Dec. 27, 2013

(65) Prior Publication Data
US 2015/0197244 A1   Jul. 16, 2015

(51) Int. Cl.
*B60W 20/10*   (2016.01)
*B60K 6/44*    (2007.10)
(Continued)

(52) U.S. Cl.
CPC .............. *B60W 20/40* (2013.01); *B60K 6/365* (2013.01); *B60K 6/445* (2013.01); *B60K 6/547* (2013.01);
(Continued)

(58) Field of Classification Search
CPC ....... B60W 20/10; B60K 6/365; B60K 6/44; B60K 6/445; B60K 6/48

USPC .................................. 701/22, 54; 477/3, 15
See application file for complete search history.

(56) References Cited

U.S. PATENT DOCUMENTS

| | | | |
|---|---|---|---|
| 6,295,487 B1 * | 9/2001 | Ono ......................... | B60K 6/44 180/165 |
| 2007/0099748 A1 * | 5/2007 | Matsubara ............. | B60K 6/365 477/3 |

(Continued)

FOREIGN PATENT DOCUMENTS

| JP | 2000-287305 A | 10/2000 |
|---|---|---|
| JP | 2008-120233 A | 5/2008 |

(Continued)

OTHER PUBLICATIONS

International Search Report issued Jul. 31, 2012 in PCT/JP2012/065660 Filed Jun. 19, 2012.

*Primary Examiner* — Yuri Kan
(74) *Attorney, Agent, or Firm* — Oblon, McClelland, Maier & Neustadt, L.L.P

(57) ABSTRACT

A power transmission device for a hybrid vehicle includes a transmission device that includes a carrier to which an engine rotation shaft is connected; a differential device that includes a plurality of rotation components individually connected to a ring gear of the transmission device, an MG1 rotation shaft, an MG2 rotation shaft, and a drive wheel; a gear shift adjustment device that includes an engagement portion capable of controlling the transmission device to a neutral state where transmission of power between the carrier and the ring gear is not allowed or to a state where the transmission of power is allowed; and an HVECU that includes a first step of decreasing a rotating speed of a first rotating electric machine at the time an engine is started up during an EV travel mode.

6 Claims, 12 Drawing Sheets

(51) Int. Cl.
- *B60K 6/365* (2007.10)
- *B60W 20/00* (2016.01)
- *B60K 6/445* (2007.10)
- *B60K 6/547* (2007.10)
- *B60W 10/08* (2006.01)
- *B60W 10/10* (2012.01)
- *B60W 10/06* (2006.01)
- *F16H 3/54* (2006.01)
- *F16H 37/08* (2006.01)

(52) U.S. Cl.
CPC .............. *B60W 10/06* (2013.01); *B60W 10/08* (2013.01); *B60W 10/10* (2013.01); *B60W 20/00* (2013.01); *B60W 20/10* (2013.01); *F16H 3/54* (2013.01); *F16H 2037/0866* (2013.01); *F16H 2200/0034* (2013.01); *F16H 2200/2005* (2013.01); *F16H 2200/2035* (2013.01); *Y02T 10/6239* (2013.01); *Y10S 903/93* (2013.01)

(56) References Cited

U.S. PATENT DOCUMENTS

| | | | |
|---|---|---|---|
| 2008/0070745 A1* | 3/2008 | Ogata | B60K 6/48 477/15 |
| 2008/0208422 A1* | 8/2008 | Shibata | B60K 6/365 701/54 |
| 2009/0203495 A1* | 8/2009 | Muta | B60K 6/445 477/3 |
| 2011/0231048 A1* | 9/2011 | Matsubara | B60K 6/365 701/22 |
| 2012/0101676 A1* | 4/2012 | Ichioka | B60K 6/445 701/22 |
| 2012/0108384 A1* | 5/2012 | Tabata | B60K 6/445 477/3 |

FOREIGN PATENT DOCUMENTS

| | | |
|---|---|---|
| JP | 2009-190694 A | 8/2009 |
| JP | 2010-070099 A | 4/2010 |
| JP | 2011-073483 A | 4/2011 |

* cited by examiner

FIG.3

| | | | CL1 | BK1 | MG1 | MG2 |
|---|---|---|---|---|---|---|
| EV | FORWARD MOVEMENT/ BACKWARD MOVEMENT | SINGLE MOTOR | WITHOUT ENGINE BRAKE | | | G | M |
| | | | WITH ENGINE BRAKE | △ | △ | G | M |
| | | DUAL MOTOR | | ○ | ○ | M | M |
| HV | FORWARD MOVEMENT | HIGH | | | ○ | G | M |
| | | LOW | | ○ | | G | M |
| | BACKWARD MOVEMENT | LOW | | ○ | | G | M |

POWER TRANSMISSION DEVICE FOR A HYBRID VEHICLE AND HYBRID SYSTEM

FIELD

The present invention relates to a power transmission device for a hybrid vehicle and a hybrid system that use an engine and a rotating electric machine as a power source.

BACKGROUND

Hitherto, a system that includes an engine, two rotating electric machines, and a power distribution mechanism (a planetary gear mechanism) is known as a hybrid system. In the hybrid system, a rotation shaft of the engine, a rotation shaft of the first rotating electric machine, a rotation shaft of the second rotating electric machine, and a drive wheel are connected to the rotation components of the power distribution mechanism. Patent Literature 1 below discloses a hybrid system in which a differential device including a pair of first and second planetary gear mechanisms, a clutch, and two brakes are interposed between a rotation shaft of an engine and a rotation component of a power distribution mechanism. The differential device is used as a transmission device which changes the rotation speed of the engine. The clutch has a configuration in which one engagement portion is connected to the rotation shaft of the engine and a carrier of the first planetary gear mechanism and the other engagement portion is connected to a ring gear of the first planetary gear mechanism. In the first planetary gear mechanism, the carrier and a sun gear respectively engage with the sun gear and the ring gear of the second planetary gear mechanism. The sun gear of the first planetary gear mechanism and the ring gear of the second planetary gear mechanism are connected to the carrier of the power distribution mechanism. The first brake is used to stop the rotation of the ring gear of the first planetary gear mechanism and the other engagement portion of the clutch. The second brake is used to stop the rotation of the carrier of the second planetary gear mechanism. In the hybrid system, an under-drive mode (a UD mode) is set in the middle-load state and the high-load state by the engagement of the clutch and the release of the brakes, an over-drive mode (an OD mode) is set in the low-load state by the release of the clutch and the second brake and the engagement of the first brake, and a backward movement mode is set by the release of the clutch and the first brake and the engagement of the second brake.

CITATION LIST

Patent Literature

Patent Literature 1: Japanese Patent Application Laid-open No. 2009-190694

SUMMARY

Technical Problem

Incidentally, in the hybrid system of the related art, the engine and the second rotating electric machine are used as the power sources, but the output of the first rotating electric machine is not transmitted to the drive wheel. Accordingly, it is desirable to provide an appropriate configuration in order to use the engine and two rotating electric machines as the power sources. However, if the engine is started up when the vehicle travels in an electric vehicle (EV) mode that only uses the output of the rotating electric machine depending on the configuration, there is a concern that a vibration (a gear shift shock) may be generated during the start-up.

Therefore, the present invention is made to solve the above-described problems of the related art, and an object thereof is to provide a power transmission device for a hybrid vehicle and a hybrid system capable of starting up an engine in an EV travel mode in which a vibration is suppressed.

Solution to Problem

In order to achieve the above mentioned object, a power transmission device for a hybrid vehicle according to the present invention includes a transmission device configured to include a first power transmission component to which a rotation shaft of an engine is connected; a differential device configured to include a plurality of rotation components capable of performing differential rotation thereof and individually connected to a second power transmission component of the transmission device, a rotation shaft of a first rotating electric machine, a rotation shaft of a second rotating electric machine, and a drive wheel; a gear shift adjustment device configured to include an engagement portion capable of controlling the transmission device to a neutral state where transmission of power between the first power transmission component and the second power transmission component is not allowed or to a state where the transmission of power between the first power transmission component and the second power transmission component is allowed; and a control device configured to include a first step of decreasing a rotating speed of the first rotating electric machine, a second step of controlling the transmission device in the neutral state to the state where the transmission of power between the first power transmission component and the second power transmission component is allowed, and a third step of increasing the rotating speed of the first rotating electric machine, at the time the engine is started up during an EV travel mode performed by transmitting the power of at least one of the first and second rotating electric machines to the drive wheel.

Further, in order to achieve the above mentioned object, a power transmission device for a hybrid vehicle according to the present invention includes a differential device configured to include a plurality of rotation components capable of performing differential rotation thereof and include a first rotation component to which a rotation shaft of an engine is connected and a second rotation component to which a rotation shaft of a first rotating electric machine is connected; a transmission device configured to include a first power transmission component to which a third rotation component of the differential device is connected and a second power transmission component to which a rotation shaft of a second rotating electric machine and a drive wheel are connected; a gear shift adjustment device configured to include an engagement portion capable of controlling the transmission device to a neutral state where transmission of power between the first power transmission component and the second power transmission component is not allowed or to a state where the transmission of power between the first power transmission component and the second power transmission component is allowed; and a control device configured to include a first step of decreasing a rotating speed of the first rotating electric machine, a second step of controlling the transmission device in the neutral state to the state where the transmission of power between the first power transmission component and the second power transmission component is allowed, and a third step of increasing the rotating speed of the first rotating electric machine, at the time the engine is started up in an EV travel mode performed by transmitting the power of at least one of the first and second rotating electric machines to the drive wheel.

Here, it is desirable that at the time a rotating speed difference between engagement members of the engagement portion is smaller than a first predetermined value, the first and second steps are performed in parallel.

It is desirable that the parallel process including the first and second steps is easily performed as the rotating speed difference decreases.

Further, it is desirable that at the time a rotating speed difference between the engagement members of the engagement portion is larger than a second predetermined value, the first and second steps are performed in parallel.

It is desirable that the parallel process including the first and second steps is easily performed as the rotating speed difference increases.

Further, in order to achieve the above mentioned object, a hybrid system according to the present invention includes an engine; a first rotating electric machine; a second rotating electric machine; a transmission device configured to include a first power transmission component to which a rotation shaft of the engine is connected; a differential device configured to include a plurality of rotation components capable of performing differential rotation thereof and individually connected to a second power transmission component of the transmission device, a rotation shaft of the first rotating electric machine, a rotation shaft of the second rotating electric machine, and a drive wheel; a gear shift adjustment device configured to include an engagement portion that controls the transmission device to a neutral state where transmission of power between the first power transmission component and the second power transmission component is not allowed at the time of an EV travel mode performed by transmitting power of at least one of the first and second rotating electric machines to the drive wheel, and controls the transmission device to a state where the transmission of power between the first power transmission component and the second power transmission component is allowed at the time the engine is started up during the EV travel mode; and a rotating electric machine control device configured to decrease the rotating speed of the first rotating electric machine before the transmission device is controlled to the state where the transmission of power is allowed or during the control to the state, and increase the rotating speed of the first rotating electric machine after the transmission device is controlled to the state where the transmission of power is allowed, at the time the engine is started up during the EV travel mode.

Further, in order to achieve the above mentioned object, a hybrid system according to the present invention includes an engine; a first rotating electric machine; a second rotating electric machine; a differential device configured to include a plurality of rotation components capable of performing differential rotation thereof and include a first rotation component to which a rotation shaft of the engine is connected and a second rotation component to which a rotation shaft of the first rotating electric machine is connected; a transmission device configured to include a first power transmission component to which a third rotation component of the differential device is connected and a second power transmission component to which a rotation shaft of the second rotating electric machine and a drive wheel are connected; a gear shift adjustment device configured to include an engagement portion that controls the transmission device to a neutral state where transmission of power between the first power transmission component and the second power transmission component is not allowed at the time of an EV travel mode performed by transmitting power of at least one of the first and second rotating electric machines to the drive wheel, and controls the transmission device to a state where the transmission of power between the first power transmission component and the second power transmission component is allowed at the time the engine is started up during the EV travel mode; and a rotating electric machine control device configured to decrease the rotating speed of the first rotating electric machine before the transmission device is controlled to the state where the transmission of power is allowed or during the control to the state, and increase the rotating speed of the first rotating electric machine after the transmission device is controlled to the state where the transmission of power is allowed, at the time the engine is started up during the EV travel mode.

Advantageous Effects of Invention

In the power transmission device for a hybrid vehicle and the hybrid system according to the present invention, when the engine is started up in the EV travel mode, the transmission device is shifted to the power transmission state after the rotating speed difference between the engagement members of the engagement portions is decreased by the rotating speed decreasing control of the first rotating electric machine, and the rotating speed of the engine is increased by the rotating speed increasing control of the first rotating electric machine, so that the degradation in durability or the gear shift shock of the engagement portion caused by the engagement can be suppressed. Accordingly, since the power transmission device for a hybrid vehicle and the hybrid system can simplify the countermeasure for the degradation in durability or the gear shift shock generated by the engagement of the engagement portions, the engagement control of the engagement portion can be easily performed.

BRIEF DESCRIPTION OF DRAWINGS

FIG. 3 is a diagram illustrating an operation engagement table of the power transmission device for a hybrid vehicle and the hybrid system of the embodiment.

DESCRIPTION OF EMBODIMENTS

Hereinafter, an embodiment of a power transmission device for a hybrid vehicle and a hybrid system according to the present invention will be described in detail with reference to the drawings. Furthermore, the present invention is not limited to the embodiment.

[Embodiment]

An embodiment of the power transmission device for a hybrid vehicle and the hybrid system according to the present invention will be described with reference to FIGS. 1 to 15.

Figure 1:
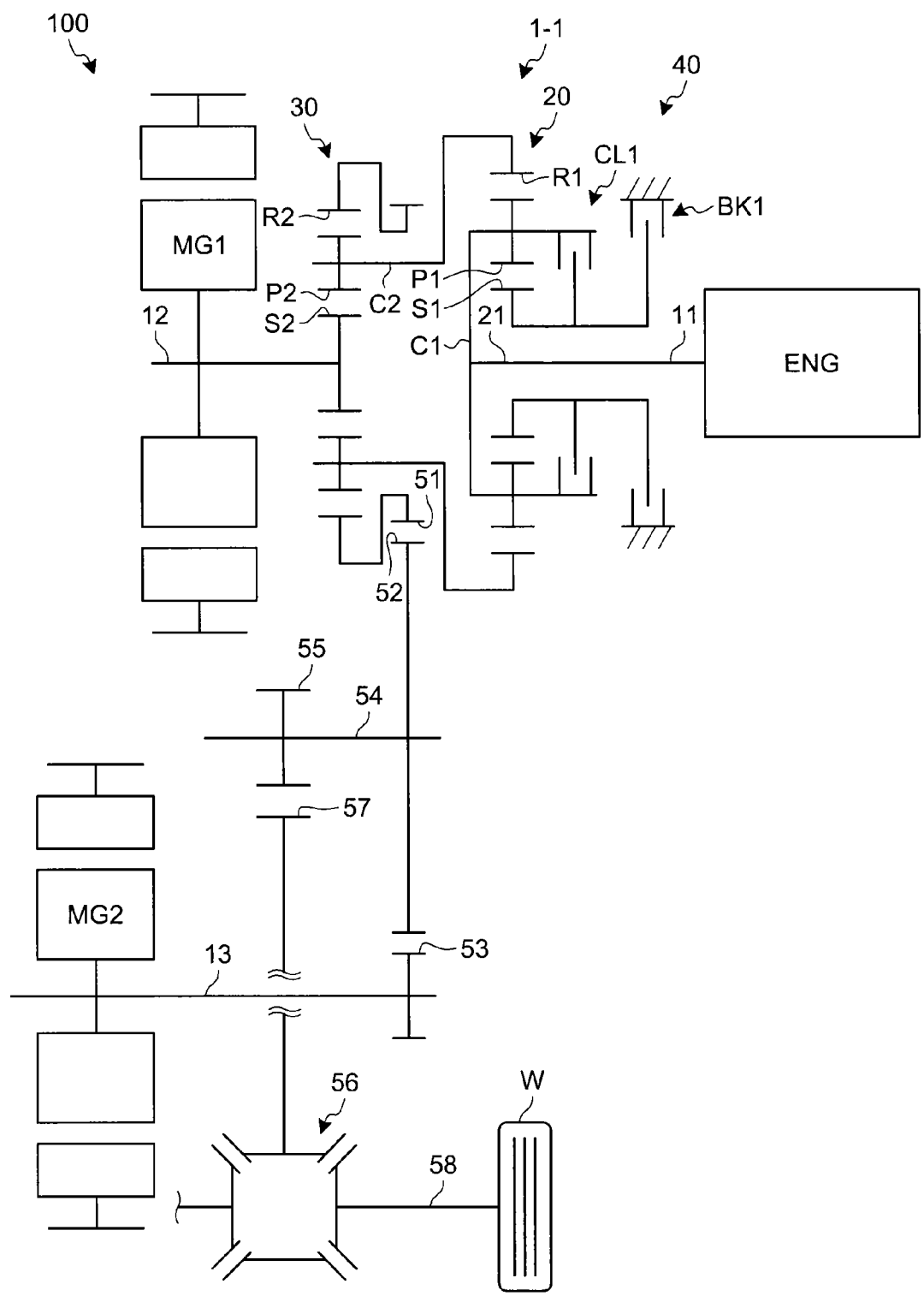
FIG. 1 is a skeleton diagram illustrating the configuration of a power transmission device for a hybrid vehicle and a hybrid system according to the present invention.

Reference Sign 1-1 of FIG. 1 indicates the hybrid system of the embodiment. Further, Reference Sign 100 of FIG. 1 indicates the hybrid vehicle equipped with a hybrid system 1-1.

The hybrid system 1-1 includes an engine ENG, a first rotating electric machine MG1, and a second rotating electric machine MG2 as power sources.

The engine ENG is an engine such as an internal-combustion engine or an external-combustion engine which outputs mechanical power (an engine torque) from an engine rotation shaft (a crank shaft) 11. The operation of the engine ENG is controlled by an electronic control device (hereinafter, referred to as the "engine ECU") 91 as an engine control device illustrated in FIG. 2. The engine ECU 91 controls the output torque (hereinafter, referred to as the "engine torque") of the engine ENG by controlling, for example, an opening degree of an electronic throttle valve, ignition based on the output of an ignition signal, and injection of fuel.

Each of the first rotating electric machine MG1 and the second rotating electric machine MG2 is an electric generator (a motor/a generator) which has a function as an electric motor (a motor) for a power running drive operation and a function as a power generator (a generator) for a regeneration drive operation. The operations of the first and second rotating electric machines MG1 and MG2 are controlled by an electronic control device (hereinafter, referred to the "MGECU") 92 as a rotating electric machine control device illustrated in FIG. 2. The first and second rotating electric machines MG1 and MG2 are connected to a secondary battery (not illustrated) through an inverter (not illustrated), and convert mechanical energy (the rotation torque) input to the rotation shafts (an MG1 rotation shaft 12 and an MG2 rotation shaft 13) into electric energy so that the electric energy is stored in a secondary battery. Further, the first and second rotating electric machines MG1 and MG2 can convert the electric energy supplied from the secondary battery or the electric energy generated by the other rotating electric machine (the second and first rotating electric machines MG2 and MG1) into the mechanical energy (the rotation torque) and can output the mechanical power (the output torque) from the rotation shafts (the MG1 rotation shaft 12 and the MG2 rotation shaft 13). The MGECU 92 adjusts, for example, the value of the current supplied to the first rotating electric machine MG1 or the second rotating electric machine MG2 so as to control the output torque (hereinafter, referred to as the "MG1 torque") of the first rotating electric machine MG1 or the output torque (hereinafter, referred to as the "MG2 torque") of the second rotating electric machine MG2. Furthermore, here, a change in the rotating speed of the first rotating electric machine MG1 or the second rotating electric machine MG2 in the normal rotation direction is referred to as an increase in the rotating speed, and a change in the rotating speed thereof in the reverse direction is referred to as a decrease in the rotating speed.

Further, the hybrid system 1-1 is equipped with a power transmission device which transmits power between the power sources and transmits the power between the power source and the drive wheel W. The power transmission device includes a transmission device 20 and a differential device 30 which are connected to each other in series. The hybrid system 1-1 of the embodiment is a multi-axial type in which the engine rotation shaft 11 and the MG1 rotation shaft 12 are coaxially disposed and the MG2 rotation shaft 13 is disposed with a gap therebetween. The hybrid system 1-1 has a configuration in which the transmission device 20 is disposed near the engine ENG and the differential device 30 is disposed near the first rotating electric machine MG1.

The transmission device 20 can transmit the rotation input from the engine ENG to the differential device 30 while changing the rotation speed thereof or can transmit the rotation input from the differential device 30 to the engine ENG while changing the rotation speed thereof. The transmission device 20 includes a first power transmission component which is connected to the engine ENG and transmits power from the engine ENG and a second power transmission component which is connected to the differential device 30 and transmits power from the differential device 30. The first power transmission component is a rotation shaft (a first rotation shaft) connected to the engine ENG or a rotation component to be described later. Further, the second power transmission component is a rotation shaft (a second rotation shaft) connected to the differential device 30 or a rotation component to be described later.

The transmission device 20 exemplified herein includes a planetary gear mechanism with a plurality of rotation components capable of performing a differential rotation. As the planetary gear mechanism, a single pinion type, a double pinion type, a Ravigneaux type, or the like can be employed. The transmission device 20 of the example is a differential device which includes one single pinion type planetary gear mechanism, and includes a sun gear S1, a ring gear R1, a plurality of pinion gears 21, and a carrier C1 as the rotation components thereof. In the transmission device 20, one of the sun gear S1, the ring gear R1, and the carrier C1 is connected to the engine ENG, and one of the rest is connected to the differential device 30. In this example, the engine ENG is connected to the carrier C1. The carrier C1 is connected to the engine rotation shaft 11 through a rotation shaft (a first rotation shaft) 21 so as to rotate along with the engine rotation shaft 11. Thus, in this example, the carrier C1 or the rotation shaft 21 becomes the first power transmission component. Further, in this example, the differential device 30 is connected to the ring gear R1. The ring gear R1 is the second power transmission component, and is connected to one (here, a carrier C2) of the rotation components of the differential device 30 so as to rotate together.

The hybrid system 1-1 is equipped with a gear shift adjustment device 40 which changes the transmission gear ratio or the gear stage of the transmission device 20. The transmission device 20 exemplified herein includes two gear stages as high and low stages, and is switched to the high and low gear stages or the neutral state by the gear shift adjustment device 40. Thus, as the engagement portions, the gear shift adjustment device 40 includes two engagement devices which adjust the rotation state or the stop state of a predetermined rotation component in the transmission device 20. In this example, the clutch CL1 and the brake BK1 are provided as the engagement devices. The engagement or release operations of the clutch CL1 and the brake BK1 are controlled by an HVECU 90 to be described later.

The clutch CL1 is a clutch device which connects or separates the sun gear S1 and the carrier C1 to or from each other. The clutch CL1 may be configured as, for example, a so-called friction engagement type clutch device or a meshing type clutch device. The clutch CL1 is engaged or released by the hydraulic pressure or the electric power, and includes a first engagement member that rotates along with the sun gear S1 and a second engagement member that rotates along with the carrier C1. The clutch CL1 exemplified herein is operated by the supply oil pressure adjusted by a hydraulic pressure adjustment device (not illustrated).

The clutch CL1 connects the sun gear S1 and the carrier C1 to each other by controlling the first engagement member and the second engagement member in the engagement state. The clutch CL1 in the half engagement state allows the relative rotation between the sun gear S1 and the carrier C1 while the first engagement member and the second engagement member are slid and are not rotated together. The clutch CL1 in the full engagement state integrates the sun gear S1 and the carrier C1 so that the relative rotation therebetween is not allowed. Thus, the clutch CL1 can prohibit the differential operation of the planetary gear mechanism of the transmission device 20 while being controlled in the full engagement state. Meanwhile, the clutch CL1 separates the sun gear S1 and the carrier C1 from each other so that the relative rotation thereof is allowed by controlling the first engagement member and the second engagement member in the release state. Thus, the clutch CL1 can allow the differential rotation of the rotation components of the transmission device 20 while being controlled in the release state.

The brake BK1 is a brake device which regulates the rotation of the sun gear S1. As in the clutch CL1, the brake BK1 may be configured as a friction engagement type or a meshing type. The brake BK1 is engaged or released by the hydraulic pressure or the electric power, and includes a first engagement member that rotates along with the sun gear S1 and a second engagement member that is fixed to a vehicle body (for example, the casing of the power transmission device). The brake BK1 exemplified herein is operated by the supply oil pressure adjusted by the hydraulic pressure adjustment device (not illustrated).

The brake BK1 regulates the rotation of the sun gear S1 by connecting the sun gear S1 to the vehicle body while the first engagement member and the second engagement member are controlled in the engagement state. The brake BK1 in the half engagement state regulates the rotation of the sun gear S1 as long as the rotation is not stopped while the first engagement member is slid on the second engagement member. The brake BK1 in the full engagement state prohibits the rotation of the sun gear S1. Meanwhile, the brake BK1 allows the rotation of the sun gear S1 by separating the sun gear S1 from the vehicle body while the first engagement member and the second engagement member are controlled in the release state.

The transmission device 20 becomes the neutral state when both the clutch CL1 and the brake BK1 are in the release state. The neutral state indicates a state where power can not be transmitted between the first rotation shaft 21 and the second rotation shaft (that is, the carrier C1 and the ring gear R1) as the input and output components of the transmission device 20 of the example. In the neutral state, the engine ENG and the differential device 30 are separated from each other so that the transmission of power therebetween is interrupted.

Meanwhile, the transmission device 20 becomes a connection state where power can be transmitted between the carrier C1 and the ring gear R1 (the engine ENG and the differential device 30) through the engagement of any one of the clutch CL1 and the brake BK1. Thus, since power can be transmitted between the engine ENG and the drive wheel W when any one of the clutch CL1 and the brake BK1 is engaged, the vehicle can travel by using the engine ENG as a power source, and an engine brake can be generated.

For example, the transmission device 20 performs a differential rotation while the sun gear S1 is fixed (so that the rotation is stopped) by releasing the clutch CL1 and engaging the brake BK1. At that time, the transmission device 20 outputs the rotation of the engine ENG input to the carrier C1 from the ring gear R1 with increasing the rotation speed thereof. That is, the transmission device 20 becomes an over-drive (OD) state in which the transmission gear ratio is smaller than 1 by releasing the clutch CL1 and engaging the brake BK1.

On the contrary, the transmission device 20 becomes a state where the differential rotation of all rotation components rotating together is prohibited by engaging the clutch CL1 and releasing the brake BK1, and hence the input and output components (the carrier C1 and the ring gear R1) are directly connected to each other. At that time, the transmission device 20 becomes a state where the transmission gear ratio is 1, and hence the rotation of the engine ENG input to the carrier C1 is output from the ring gear R1 at the constant speed without increasing the rotation speed thereof.

In this way, the transmission device 20 becomes a high speed gear stage (a high speed stage) by releasing the clutch CL1 and engaging the brake BK1, and becomes a low speed gear stage (a low speed stage) by engaging the clutch CL1 and releasing the brake BK1. In the hybrid system 1-1, since the transmission gear ratio of the transmission device 20 is 1 or less, there is no need to inevitably increase the torque of the first rotating electric machine MG1.

The differential device 30 includes a plurality of rotation components capable of performing a differential rotation, and includes a planetary gear mechanism with the rotation components. As the planetary gear mechanism, a single pinion type, a double pinion type, a Ravigneaux type, or the like can be employed. The differential device 30 of the example includes one single pinion type planetary gear mechanism, and includes a sun gear S2, a ring gear R2, a plurality of pinion gears P2, and a carrier C2 as the rotation components thereof. In the differential device 30, one of the sun gear S2, the ring gear R2, and the carrier C2 is connected to the engine ENG through the transmission device 20, one of the rest is connected to the first rotating electric machine MG1, and the last one is connected to the second rotating electric machine MG2 and the drive wheel W. In this example, the ring gear R1 of the transmission device 20 is connected to the carrier C2, the first rotating electric machine MG1 is connected to the sun gear S2, and the second rotating electric machine MG2 and the drive wheel W are connected to the ring gear R2. Here, the carrier C2 is a rotation component which is connected to the ring gear R1 so as to rotate along with the ring gear R1 of the transmission device 20, and becomes a power transmission component with respect to the transmission device 20. Further, the sun gear S2 is a rotation component which is connected to the MG1 rotation shaft 12 so as to rotate together, and becomes a power transmission component with respect to the first rotating electric machine MG1. Further, the ring gear R2 is a rotation component which is connected to the second rotating electric machine MG2 or the drive wheel W through a gear group below, and becomes a power transmission component with respect to the second rotating electric machine MG2 or the drive wheel W.

A counter drive gear 51 is connected to the ring gear R2 of the differential device 30 so as to rotate together while being disposed coaxially. The counter drive gear 51 engages with a counter driven gear 52 including a rotation shaft disposed while being deviated in parallel. The counter driven gear 52 engages with a reduction gear 53 including a rotation shaft disposed while being deviated in parallel. The reduction gear 53 is fixed onto the MG2 rotation shaft 13. Thus, power is transmitted between the counter driven gear 52 and the second rotating electric machine MG2 through the reduction gear 53. For example, the reduction gear 53 has a diameter smaller than the counter driven gear 52, and transmits the rotation of the second rotating electric machine MG2 to the counter driven gear 52 while decreasing the rotation speed thereof.

Further, the counter driven gear 52 is fixed onto a counter shaft 54. Here, the hybrid vehicle 100 of the example is assumed as an FF (Front Engine Front Drive) vehicle, an RR (Rear Engine Rear Drive) vehicle, or a four-wheel-drive vehicle based on the FF vehicle or the RR vehicle. For this reason, a drive pinion gear 55 is fixed onto the counter shaft 54. The counter driven gear 52 and the drive pinion gear 55 can rotate together through the counter shaft 54. The drive pinion gear 55 engages with a differential ring gear 57 of a differential device 56. The differential device 56 is connected to the drive wheels W through left and right drive shafts 58. For example, the hybrid system 1-1 can be decreased in size by disposing the drive pinion gear 55 and the differential ring gear 57 (that is, the differential device 56) between the second rotating electric machine MG2 and the reduction gear 53.

In the power transmission device of the hybrid system 1-1, the entire transmission gear ratio (in other words, the system transmission gear ratio of the hybrid system 1-1) including the transmission gear ratio of the transmission device 20 and the transmission gear ratio of the differential device 30 is determined. The system transmission gear ratio indicates the ratio between the input and output components of one power transmission device including the transmission device 20 and the differential device 30, and indicates the ratio (the deceleration ratio) of the input side rotating speed with respect to the output side rotating speed of the power transmission device. In this example, the ratio of the rotating speed of the carrier C1 of the transmission device 20 with respect to the rotating speed of the ring gear R2 of the differential device 30 becomes the system transmission gear ratio. Thus, in the power transmission device, the range of the transmission gear ratio is widened compared to the case where the transmission only includes the differential device 30.

Figure 2:
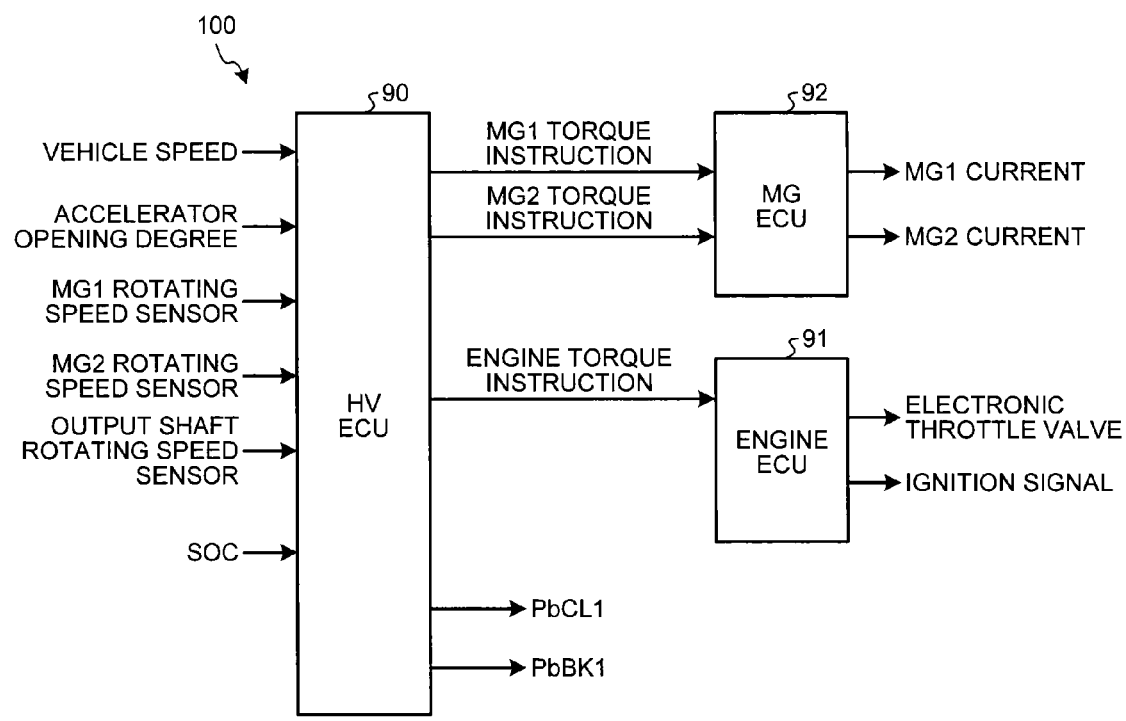
FIG. 2 is a diagram illustrating an input/output relation of an embodiment.

As illustrated in FIG. 2, the hybrid system 1-1 is equipped with the integrated ECU (hereinafter, referred to as the "HVECU") 90 which controls the engine ECU 91 and the MGECU 92 together and controls the entire system, and hence the control device of the system is configured.

Various sensors such as a vehicle speed sensor, an accelerator opening degree sensor, an MG1 rotating speed sensor, an MG2 rotating speed sensor, an output shaft rotating speed sensor, and a battery sensor are connected to the HVECU 90. The HVECU 90 acquires the vehicle speed, the accelerator opening degree, the rotating speed (the MG1 rotating speed) of the first rotating electric machine MG1, the rotating speed (the MG2 rotating speed) of the second rotating electric machine MG2, the rotating speed of the output shaft (for example, the rotation shaft of the ring gear R2 of the differential device 30) of the power transmission device, and the SOC (State Of Charge) of the secondary battery by various sensors.

The HVECU 90 calculates the required driving force, the required power, the required torque, and the like for the hybrid vehicle 100 based on the acquired information. The HVECU 90 calculates the required engine torque, the required MG1 torque, and the required MG2 torque based on, for example, the calculated required vehicle driving force. The HVECU 90 transmits the required engine torque to the engine ECU 91 so that the required engine torque is output to the engine ENG, and transmits the required MG1 torque and the required MG2 torque to the MGECU 92 so that the required MG1 torque and the required MG2 torque are output to the first rotating electric machine MG1 and the second rotating electric machine MG2.

Further, the HVECU 90 controls the clutch CL1 and the brake BK1 based on the travel mode and the like to be described later. At that time, the HVECU 90 outputs a supply oil pressure instruction value (PbCL1) for the clutch CL1 and a supply oil pressure instruction value (PbBK1) for the brake BK1 to the hydraulic pressure adjustment device. The hydraulic pressure adjustment device engages or releases the clutch CL1 and the brake BK1 by controlling the supply oil pressure in response to the instruction values PbCL1 and PbBK1.

In the hybrid system 1-1, an electric vehicle (EV) travel mode and a hybrid (HV) travel mode are set, and the hybrid vehicle 100 can travel in any one of the travel modes.

The EV travel mode is the travel mode which transmits the power of at least one of the first and second rotating electric machines MG1 and MG2 to the drive wheel W. The HV travel mode is the travel mode capable of performing a travel operation of transmitting only the power of the engine ENG to the drive wheel W and a travel operation of transmitting the power of the second rotating electric machine MG2 to the drive wheel W in addition to the power of the engine ENG.

FIG. 3 illustrates the operation engagement table of the hybrid system 1-1 for each travel mode. In the section of the clutch CL1 and the section of the brake BK1 of the operation engagement table, the circle indicates the engagement state, and the blank indicates the release state. Further, the triangle indicates a state where the brake BK1 becomes the release state when the clutch CL1 is the engagement state and the brake BK1 becomes the engagement state when the clutch CL1 is the release state. In the section of the first rotating electric machine MG1 and the section of the second rotating electric machine MG2 of the operation engagement table, "G" indicates a state where the generator is mainly used, and "M" indicates a state where the electric motor is mainly used.

[EV Travel Mode]

The EV travel mode can be classified into a single motor EV mode which uses only the second rotating electric machine MG2 as the power source and a dual motor EV mode which uses both the first and second rotating electric machines MG1 and MG2 as the power sources. In the hybrid system 1-1, for example, the single motor EV mode is selected in a low-load operation state and the dual motor EV mode is selected in a high-load operation state.

[Single Motor EV Mode]

Figure 4:
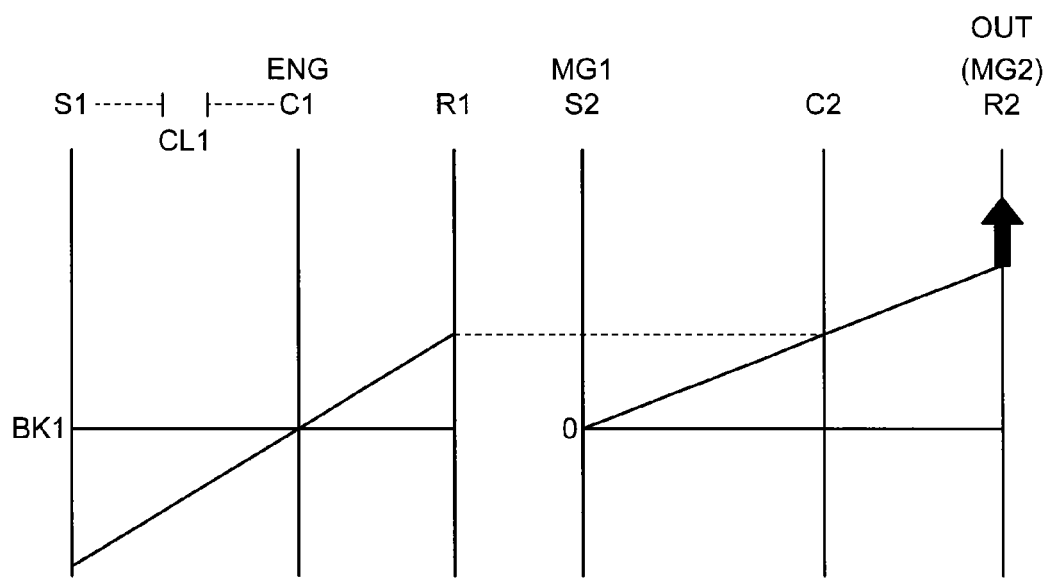
FIG. 4 is an alignment chart according to a single motor EV mode.

When the secondary battery can be charged based on the SOC in the single motor EV mode, the HVECU 90 does not need to consume electric power by the engine brake, and hence releases both the clutch CL1 and the brake BK1. Accordingly, the planetary gear mechanism of the transmission device 20 becomes the neutral state, and hence the differential rotation of the rotation components can be performed. In this case, the HVECU 90 generates a vehicle driving force in the hybrid vehicle 100 in the forward moving direction by outputting a positive MG2 torque in response to the required vehicle driving force to the MGECU 92 as the normal rotation of the second rotating electric machine MG2. The normal rotation indicates the rotation direction of the MG2 rotation shaft 13 or the ring gear R2 of the differential device 30 when the vehicle moves forward. FIG. 4 illustrates an alignment chart when the vehicle moves forward.

Here, since the ring gear R2 rotates normally while being interlocked with the rotation of the counter driven gear 52 when the vehicle moves forward in the single motor EV mode (without requiring the engine brake), there is a possibility that dragging loss may be generated in the first rotating electric machine MG1 in accordance with the differential rotation of the differential device 30. For this reason, the HVECU 90 reduces the dragging loss by operating the first rotating electric machine MG1 as the generator. Specifically, the HVECU 90 generates electric power by applying a slight torque to the first rotating electric machine MG1, and performs feed-back control so that the MG1 rotating speed becomes zero, thereby reducing the dragging loss of the first rotating electric machine MG1. Further, when the rotating speed of the first rotating electric machine MG1 can be maintained at zero without applying a torque to the first rotating electric machine MG1, the dragging loss of the first rotating electric machine MG1 can be reduced without applying a torque to the first rotating electric machine MG1. Further, in order to reduce the dragging loss of the first rotating electric machine MG1, the rotating speed of the first rotating electric machine MG1 may be set to zero by using the cogging torque of the first rotating electric machine MG1 or the d-axis locking. The d-axis locking indicates a state where the rotating speed of the first rotating electric machine MG1 is controlled at zero by the current generating a magnetic field for fixing a rotor supplied from an inverter to the first rotating electric machine MG1.

Further, when the vehicle moves forward, the ring gear R1 of the transmission device 20 also rotates normally along with the carrier C2. At that time, since the transmission device 20 becomes the neutral state where the clutch CL1 and the brake BK1 are released, the carrier C1 stops at the same time when the sun gear S1 revolves while rotating reversely, and the engine ENG is not rotated while the rotating speed thereof is zero. Thus, a large regeneration amount of the first rotating electric machine MG1 can be obtained when the vehicle moves forward. Further, the vehicle can travel while the engine ENG is stopped when the vehicle moves forward. Further, since the dragging loss is not caused by the rotation of the engine ENG in the EV travel mode when the vehicle moves forward, the fuel economy (the electric economy) can be improved.

Furthermore, if the secondary battery can be charged when the vehicle moves backward, both the clutch CL1 and the brake BK1 are released so that a negative MG2 torque in response to the required vehicle driving force is output to the second rotating electric machine MG2 by the reverse rotation, and hence a driving force is generated in the hybrid vehicle 100 in the backward moving direction. Even at that time, the HVECU 90 reduces the dragging loss of the first rotating electric machine MG1 as in the case where the vehicle moves forward.

Meanwhile, when the SOC is larger than a predetermined value and the charging of the secondary battery is prohibited in the single motor EV mode, the engine brake may be used together in the above-described drive state so that the secondary battery can be discharged. For this reason, in this case, when any one of the clutch CL1 and the brake BK1 is engaged as illustrated in FIG. 3, the engine ENG is rotated, and hence the engine brake is generated. At that time, the HVECU 90 increases the engine rotating speed by the control of the first rotating electric machine MG1.

[Dual Motor EV Mode]

Figure 5:
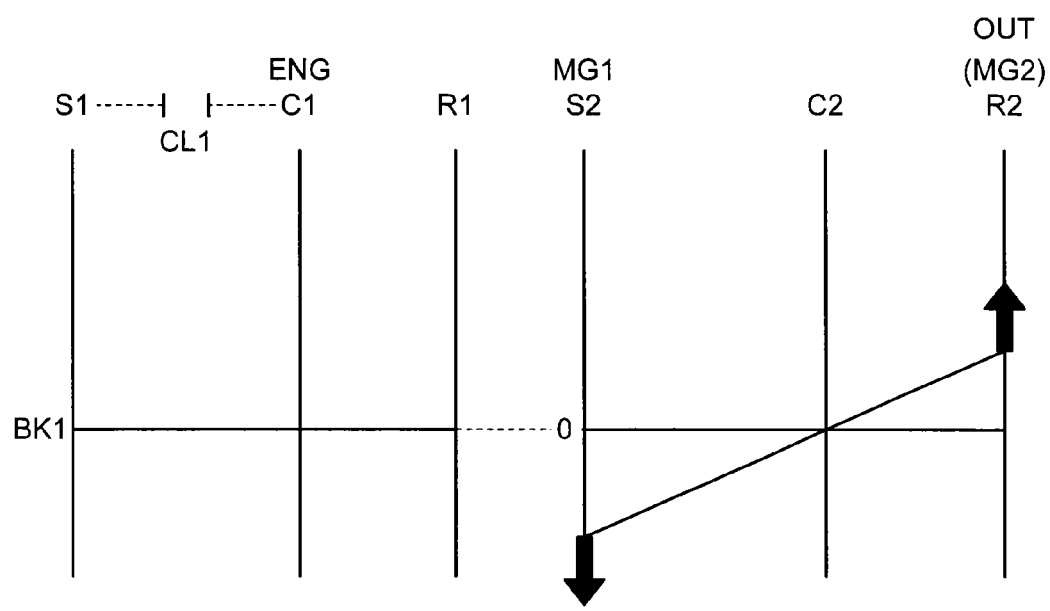
FIG. 5 is an alignment chart according to a dual motor EV mode.

In the dual motor EV mode, the HVECU 90 engages both the clutch CL1 and the brake BK1. Accordingly, in the transmission device 20, the differential rotation of the planetary gear mechanism is prohibited in accordance with the engagement of the clutch CL1 and the rotation of the sun gear S1 is prohibited in accordance with the engagement of the brake BK1, so that all rotation components of the planetary gear mechanism are stopped. For this reason, the rotating speed of the engine ENG becomes zero. Further, since the ring gear R1 is stopped, the carrier C2 connected to the ring gear R1 of the differential device 30 is also stopped, and hence the carrier C2 is locked so that the rotating speed becomes zero. FIG. 5 illustrates an alignment chart at this time.

The HVECU 90 outputs an MG1 torque and an MG2 torque to the first rotating electric machine MG1 and the second rotating electric machine MG2 in response to the required vehicle driving force. Here, since the rotation of the carrier C2 at that time is stopped, a reaction force with respect to the MG1 torque can be obtained. Thus, the differential device 30 can output the MG1 torque from the ring gear R2. If a negative MG2 torque is output to the first rotating electric machine MG1 by the reverse rotation when the vehicle moves forward, a positive torque can be output from the ring gear R2. Meanwhile, if a positive MG2 torque is output to the first rotating electric machine MG1 when the vehicle moves backward, a negative torque can be output from the ring gear R2.

Furthermore, if the secondary battery can be charged when the vehicle moves backward, both the clutch CL1 and the brake BK1 are engaged and the carrier C1 of the transmission device 20 is fixed, so that the vehicle may travel by the power of both the first rotating electric machine MG1 and the second rotating electric machine MG2.

[HV Travel Mode]

Figure 6:
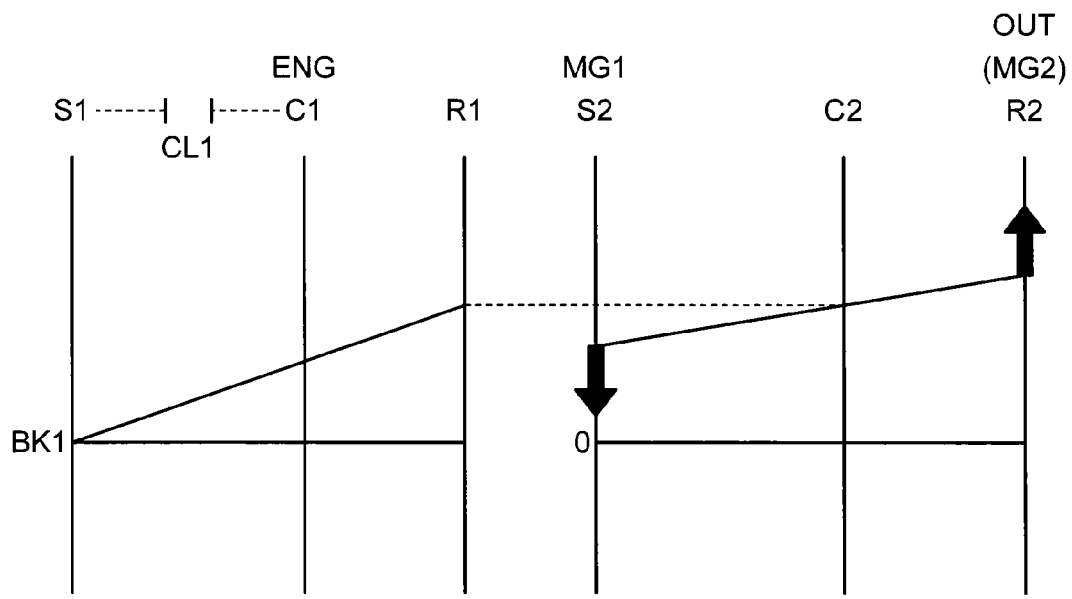
FIG. 6 is an alignment chart according to an HV high mode.
Figure 7:
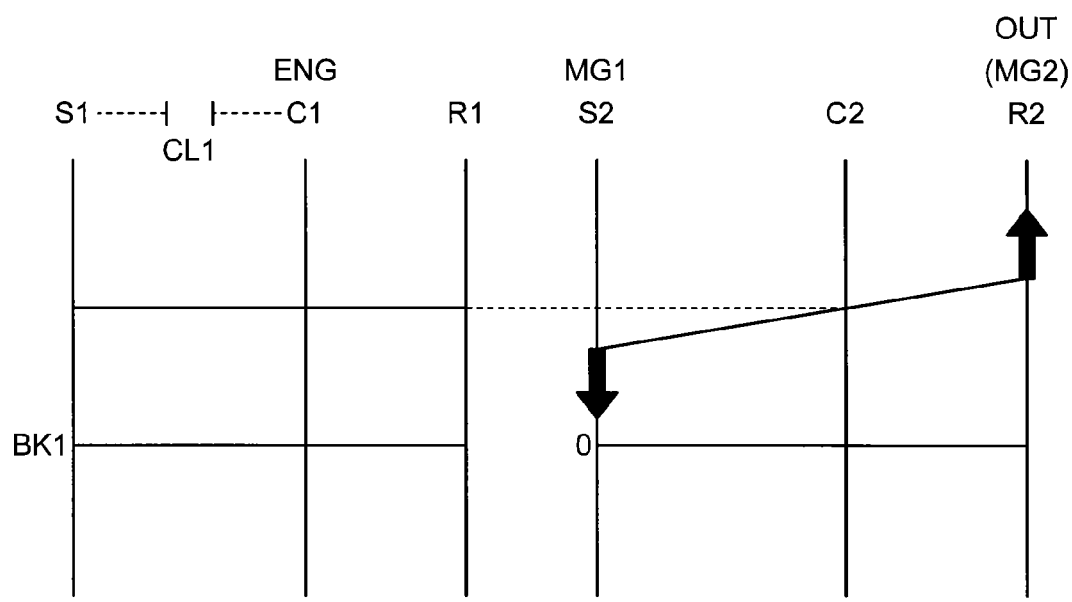
FIG. 7 is an alignment chart according to an HV low mode.

In the HV travel mode, the vehicle travels by transmitting only the engine torque or both the engine torque and the MG2 torque to the drive shaft 58 while acquiring a reaction force by the first rotating electric machine MG1. The engine torque which is transmitted to the drive shaft 58 at that time is called a so-called direct engine delivery torque, and is mechanically transmitted from the engine ENG to the drive shaft 58 without using the electric path. The HV travel mode can be classified into the travel mode (hereinafter, referred to as the "HV high mode") in which the transmission device 20 is switched to the high speed stage and the travel mode (hereinafter, referred to as the "HV low mode") in which the transmission device 20 is switched to the low speed stage. In the hybrid system 1-1 of the example, the HV high mode capable of reducing the circulation of the power is selected when the vehicle travels at the high vehicle speed, and the HV low mode is selected when the vehicle travels at the middle and low vehicle speeds. FIG. 6 illustrates an alignment chart in the HV high mode. Further, FIG. 7 illustrates an alignment chart in the HV low mode. In the HV travel mode, the differential device 30 can basically perform the differential rotation, and the gear stage of the transmission device 20 is switched by the control of the states (the engagement state or the release state) of the clutch CL1 and the brake BK1.

In the HV high mode, the HVECU 90 performs control in which the rotation of the engine ENG is output while the rotation speed thereof is increased after the transmission device 20 is switched to the high speed stage by the release of the clutch CL1 and the engagement of the brake BK1. Meanwhile, in the HV low mode, the HVECU 90 performs control in which the rotation of the engine ENG is output at the constant speed after the transmission device 20 is switched to the low speed stage by the engagement of the clutch CL1 and the release of the brake BK1.

The HV low mode is used when the vehicle moves backward. When the vehicle moves backward, the first rotating electric machine MG1 is operated as the generator and the second rotating electric machine MG2 is operated as the electric motor so that the second rotating electric machine MG2 is rotated in a direction opposite to the forward moving direction.

The HVECU 90 performs cooperative gear shift control of simultaneously shifting the transmission device 20 and the differential device 30 when the HV high mode and the HV low mode are switched. In the cooperative gear shift control, one transmission gear ratio of the transmission device 20 and the differential device 30 is increased, and the other transmission gear ratio is decreased.

Specifically, when the HVECU 90 switches the HV high mode to the HV low mode, the transmission gear ratio of the differential device 30 is changed to the high gear side in synchronization with the gear shift operation to the low speed stage of the transmission device 20 so that the system transmission gear ratio in the gear shift operation is maintained at a constant value. On the contrary, when the HVECU 90 switches the HV low mode to the HV high mode, the transmission gear ratio of the differential device 30 is changed to the low gear side in synchronization with the gear shift operation to the high speed stage of the transmission device 20 so that the system transmission gear ratio in the gear shift operation is maintained at a constant value. In this way, since a non-continuous change of the system transmission gear ratio is suppressed or reduced in the hybrid system 1-1, the engine rotating speed adjustment amount with the gear shift operation is decreased or the adjustment of the engine rotating speed with the gear shift operation is not needed.

After the HV low mode is selected, the HVECU 90 continuously changes the system transmission gear ratio to the low gear side by, for example, the control of the transmission gear ratio of the differential device 30. Meanwhile, after the HV high mode is selected, the HVECU 90 continuously changes the system transmission gear ratio to the high gear side by, for example, the control of the transmission gear ratio of the differential device 30. The control of the transmission gear ratio of the differential device 30 is performed by, for example, the control of the rotating speed of the first rotating electric machine MG1 or the second rotating electric machine MG2. In the hybrid system 1-1, the transmission system in the entire system is configured by the transmission device 20, the differential device 30, the first rotating electric machine MG1, the clutch CL1, and the brake BK1. For this reason, these configurations can be used in an electric continuously variable transmission of which the system transmission gear ratio is continuously changed by the electric control of the rotation of the first rotating electric machine MG1.

Figure 8:
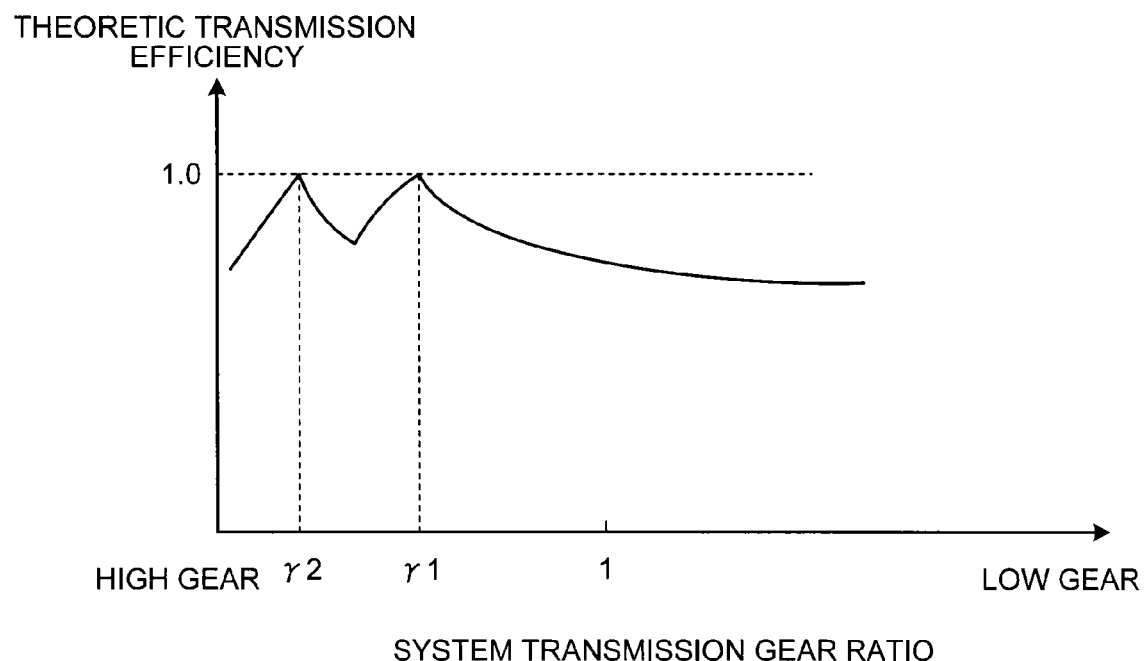
FIG. 8 is a diagram illustrating a theoretic transmission efficiency line.

FIG. 8 is a diagram illustrating a theoretic transmission efficiency line in the HV travel mode and illustrating a theoretic transmission efficiency line when the HV high mode is switched to the HV low mode. In this drawing, the horizontal axis indicates the system transmission gear ratio, and the vertical axis indicates the theoretic transmission efficiency in the HV travel mode. In the HV travel mode, a high efficient travel mode is selected from the HV high mode and the HV low mode, for example, at the same transmission gear ratio by using the theoretic transmission efficiency line.

Regarding the theoretic transmission efficiency, the maximum efficiency becomes 1.0 when the power input to the power transmission device is transmitted to the counter drive gear 51 through the mechanical transmission without using the electric path. In the theoretic transmission efficiency of the HV low mode, the maximum efficiency of the system transmission gear ratio becomes 1.0 at the transmission gear ratio $\gamma 1$. The transmission gear ratio $\gamma 1$ becomes the over-driver side system transmission gear ratio ($\gamma 1 < 1$). Further, in the theoretic transmission efficiency of the HV high mode, the maximum efficiency of the system transmission gear ratio becomes 1.0 at the transmission gear ratio $\gamma 2$. The transmission gear ratio $\gamma 2$ becomes the high gear side transmission gear ratio ($\gamma 2 < \gamma 1$) in relation to the transmission gear ratio $\gamma 1$. When the system transmission gear ratio is the transmission gear ratio $\gamma 1$ or the transmission gear ratio $\gamma 2$, the rotating speed of the first rotating electric machine MG1 (the sun gear S2) becomes zero. For this reason, when the system transmission gear ratio is the transmission gear ratio $\gamma 1$ or the transmission gear ratio $\gamma 2$, the electric path in which the first rotating electric machine MG1 receives the reaction force becomes zero, and hence power can be transmitted from the engine ENG to the counter drive gear 51 according to only the transmission of the mechanical power. Hereinafter, the transmission gear ratio $\gamma 1$ is referred to as the "first mechanical transmission gear ratio $\gamma 1$". Further, the transmission gear ratio $\gamma 2$ is referred to as the "second mechanical transmission gear ratio $\gamma 2$".

As obvious from FIG. 8, the theoretic transmission efficiency of the HV travel mode decreases as the system transmission gear ratio becomes the low gear side value in relation to the first mechanical transmission gear ratio $\gamma 1$. Further, the theoretic transmission efficiency decreases as the system transmission gear ratio becomes the high gear side value in relation to the second mechanical transmission gear ratio $\gamma 2$. Further, the theoretic transmission efficiency is curved to the low-efficiency side in an area of the transmission gear ratio between the first mechanical transmission gear ratio $\gamma 1$ and the second mechanical transmission gear ratio $\gamma 2$.

In this way, the power transmission device of the hybrid system 1-1 includes two mechanical points (the first mechanical transmission gear ratio $\gamma 1$ and the second mechanical transmission gear ratio γ2) in an area where the system transmission gear ratio is located at the high gear side in relation to 1. Then, since the transmission device 20, the clutch CL1, and the brake BK1 are provided in the power transmission device, a separate mechanical point (the second mechanical transmission gear ratio γ2) can be generated at the high gear side in relation to the mechanical point (the first mechanical transmission gear ratio γ1) in the case where the engine ENG is directly connected to the carrier C2 of the differential device 30. Thus, in the hybrid system 1-1, it is possible to improve the transmission efficiency at the high gear in the HV travel mode, and hence to improve the fuel economy when the vehicle travels at the high vehicle speed.

Figure 9:
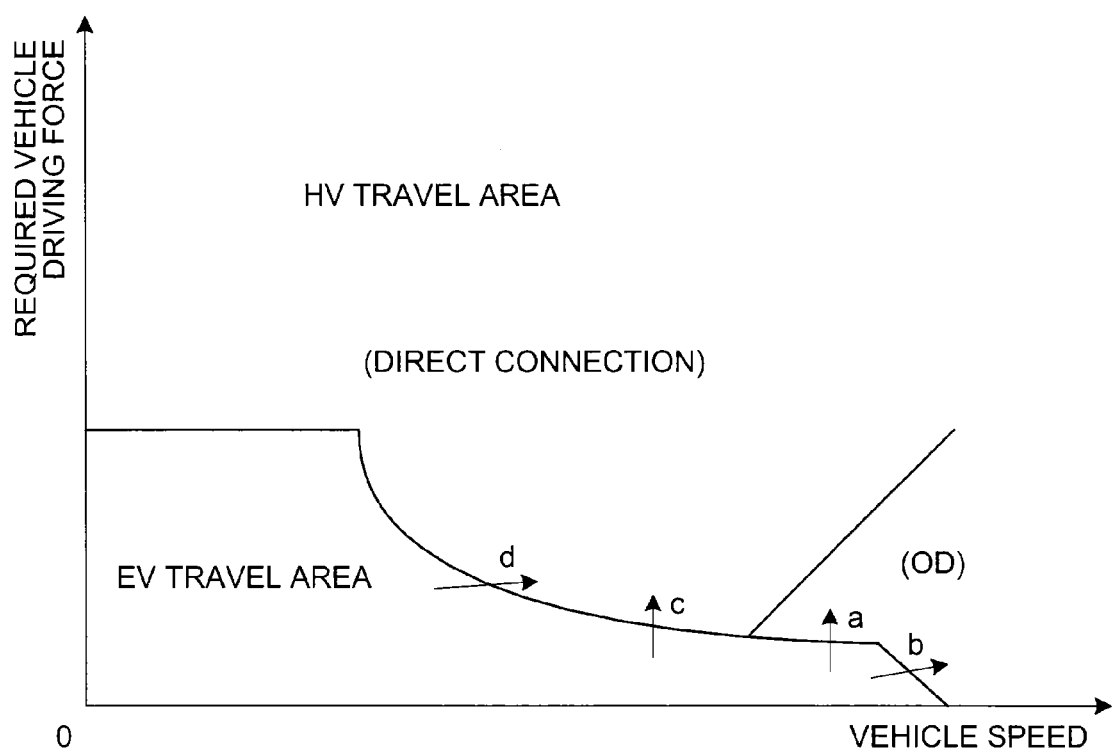
FIG. 9 is a diagram illustrating an EV travel area and an HV travel area.

Here, FIG. 9 illustrates an example of the corresponding relation of the vehicle speed, the required vehicle driving force, and the travel mode. In the hybrid system 1-1, as illustrated in FIG. 9, the EV travel mode is performed when the vehicle speed is low and the required vehicle driving force is in the low-load state. Here, the EV travel area is narrowed to the low-load point as the vehicle speed increases in response to the output characteristics of the first rotating electric machine MG1 or the second rotating electric machine MG2. In other words, when the vehicle speed is high and the required vehicle driving force is in the low-load state, the transmission device 20 is controlled in the over-drive state (the high speed stage) by the release of the clutch CL1 and the engagement of the brake BK1, and hence the fuel economy is improved in the HV travel mode. In the remaining area (that is, when the required vehicle driving force is in the middle-load state and the high-load state regardless of the vehicle speed and when the vehicle speed is middle and the required vehicle driving force is in the low-load state), the transmission device 20 is controlled in the direct connection state (the low speed stage) so as to enter the HV travel mode by the engagement of the clutch CL1 and the release of the brake BK1. Furthermore, even when the vehicle speed is high and the required vehicle driving force is in the low-load state, the transmission device 20 is controlled in the direct connection state as the vehicle speed decreases.

The HVECU 90 starts up the stopped engine ENG when the EV travel mode is switched to the HV travel mode. For example, when the HVECU 90 determines that the EV travel mode needs to be switched to the HV travel mode in accordance with an increase in the required vehicle driving force or an increase in the vehicle speed, the HVECU requires the start-up of the engine ENG for the engine ECU 91.

Then, in the hybrid system 1-1, when the HV travel mode (the HV high mode or the HV low mode) selected based on the vehicle speed or the required vehicle driving force is determined, the target gear shift stage (the target transmission gear ratio) of the transmission device 20 is determined after the completion of the start-up of the engine in response to the HV travel mode. When the HV high mode is selected, the high speed stage (the over-drive state) is required by the release of the clutch CL1 and the engagement of the brake BK1 as the target gear shift stage (the target transmission gear ratio) of the transmission device 20 after the completion of the start-up of the engine (see the arrows a and b of FIG. 9). Further, when the HV low mode is selected, the low speed stage (the direct connection state) is required by the engagement of the clutch CL1 and the release of the brake BK1 as the target gear shift stage (the target transmission gear ratio) of the transmission device 20 after the completion of the start-up of the engine (see the arrows c and d of FIG. 9).

When the current EV travel mode is the single motor EV mode (without needing the engine brake), the transmission device 20 selects the target gear shift stage (the target transmission gear ratio) in response to the selected HV travel mode in that the current state is the neutral state. Further, when the current EV travel mode is the single motor EV mode also using the engine brake, the transmission device 20 selects the target gear shift stage (the target transmission gear ratio) when the current gear stage is different from the target gear shift stage (the target transmission gear ratio) in response to the selected HV travel mode in that the current stage is the high speed stage or the low speed stage. Further, when the current EV travel mode is the dual motor EV mode, the transmission device 20 selects the target gear shift stage (the target transmission gear ratio) in response to the selected HV travel mode in that both the clutch CL1 and the brake BK1 are engaged.

In this way, in the hybrid system 1-1, there is a case in which the gear shift operation of the transmission device 20 may be required when the EV travel mode is switched to the HV travel mode. Then, when the gear shift operation of the transmission device 20 of the neutral state is required, there is a need to control the clutch CL1 or the brake BK1 as the engagement control target in response to the target gear shift stage (the target transmission gear ratio) to the engagement state. Here, in the transmission device 20 of the neutral state, the clutch CL1 and the brake BK1 become the release state, and hence there is a case in which the rotating speed difference $\Delta N$ occurs in the clutch CL1 or the brake BK1. The rotating speed difference $\Delta N$ indicates a difference in the rotating speed between the first engagement member and the second engagement member of the clutch CL1 or the brake BK1. For this reason, when the clutch CL1 or the brake BK1 is engaged in the case where the rotating speed difference $\Delta N$ increases in the clutch CL1 or the brake BK1 of the engagement control target, there is a concern that the durability of the clutch CL1 or the brake BK1 may be degraded and the gear shift shock may be generated. Therefore, when the HVECU 90 of the embodiment starts up the engine ENG in the EV travel mode due to the request of the switching from the EV travel mode to the HV travel mode, the rotating speed difference $\Delta N$ of the clutch CL1 or the brake BK1 of the engagement control target in response to the target gear shift stage is decreased when the transmission device 20 is shifted to the target gear shift stage (the target transmission gear ratio) after the start-up of the engine. That is, the HVECU 90 suppresses the gear shift shock or the degradation in durability of the clutch CL1 or the brake BK1 of the engagement control target by decreasing the rotating speed difference $\Delta N$.

Here, when sudden acceleration is required by the driver or the vehicle in the EV travel mode, the mode switching responsiveness may be degraded due to the control of decreasing the rotating speed difference $\Delta N$ since there is a need to promptly select the HV travel mode. For this reason, where sudden acceleration is required, it is desirable that the HVECU 90 increase the responsiveness until the completion of the gear shift operation of the transmission device 20 without performing the control of decreasing the rotating speed difference $\Delta N$. However, when the control of decreasing the rotating speed difference $\Delta N$ is not performed until the rotating speed difference $\Delta N$ of the clutch CL1 or the brake BK1 of the engagement control target increases even when the sudden acceleration is required, there is a concern that the gear shift shock or the degradation in durability of the clutch CL1 or the brake BK1 may be caused. Meanwhile, when the rotating speed difference $\Delta N$ is small, the degradation in durability or the gear shift shock is not caused even when the clutch CL1 or the brake BK1 of the engagement control target is engaged. That is, there is no need to essentially perform the control of decreasing the rotating speed difference ΔN when the rotating speed difference ΔN is small.

Figure 10:
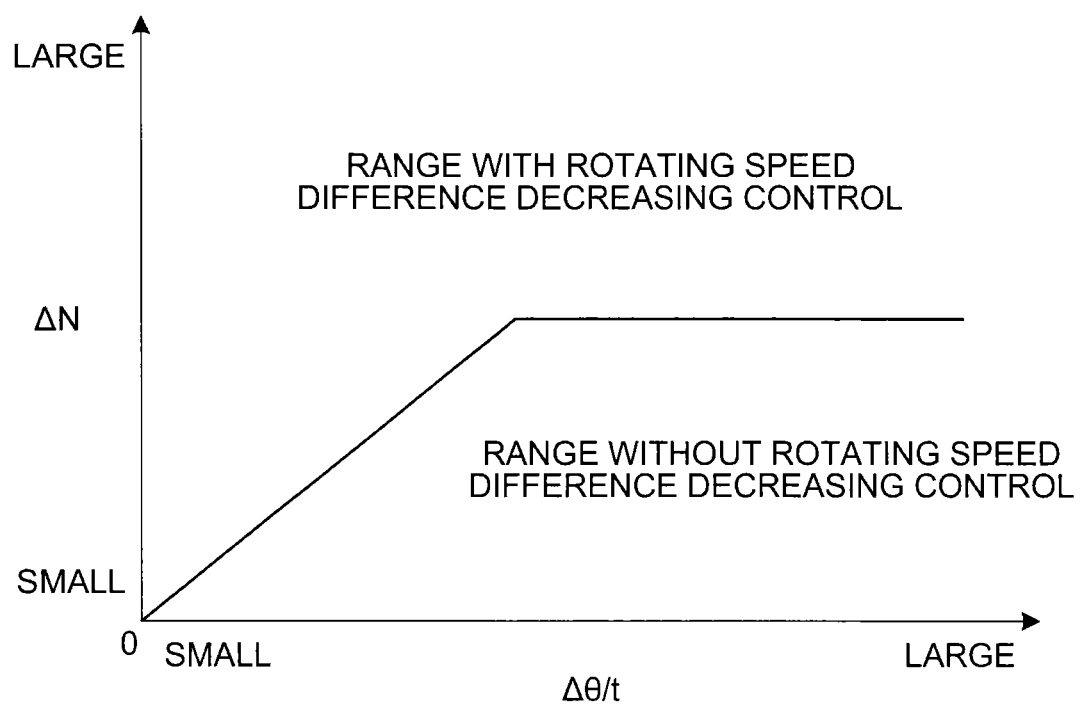
FIG. 10 is a diagram illustrating an execution range of rotating speed difference decreasing control.

Therefore, the HVECU 90 suppresses the degradation in durability or the gear shift shock by performing the control of decreasing the rotating speed difference ΔN regardless of the request of the sudden acceleration when the rotating speed difference ΔN of the clutch CL1 or the brake BK1 of the engagement control target is large. Further, the HVECU 90 suppresses the degradation in durability or the gear shift shock by performing the control of decreasing the rotating speed difference ΔN even when the rotating speed difference ΔN is small and the sudden acceleration is not required. Meanwhile, the HVECU 90 increases the responsiveness until the completion of the gear shift operation of the transmission device 20 without performing the control of decreasing the rotating speed difference ΔN when the rotating speed difference ΔN is small and the sudden acceleration is required. FIG. 10 illustrates an example of the execution range of the control of decreasing the rotating speed difference ΔN. Here, it is determined whether the sudden acceleration is required based on the accelerator opening degree change rate Δθ/t.

Figure 11:
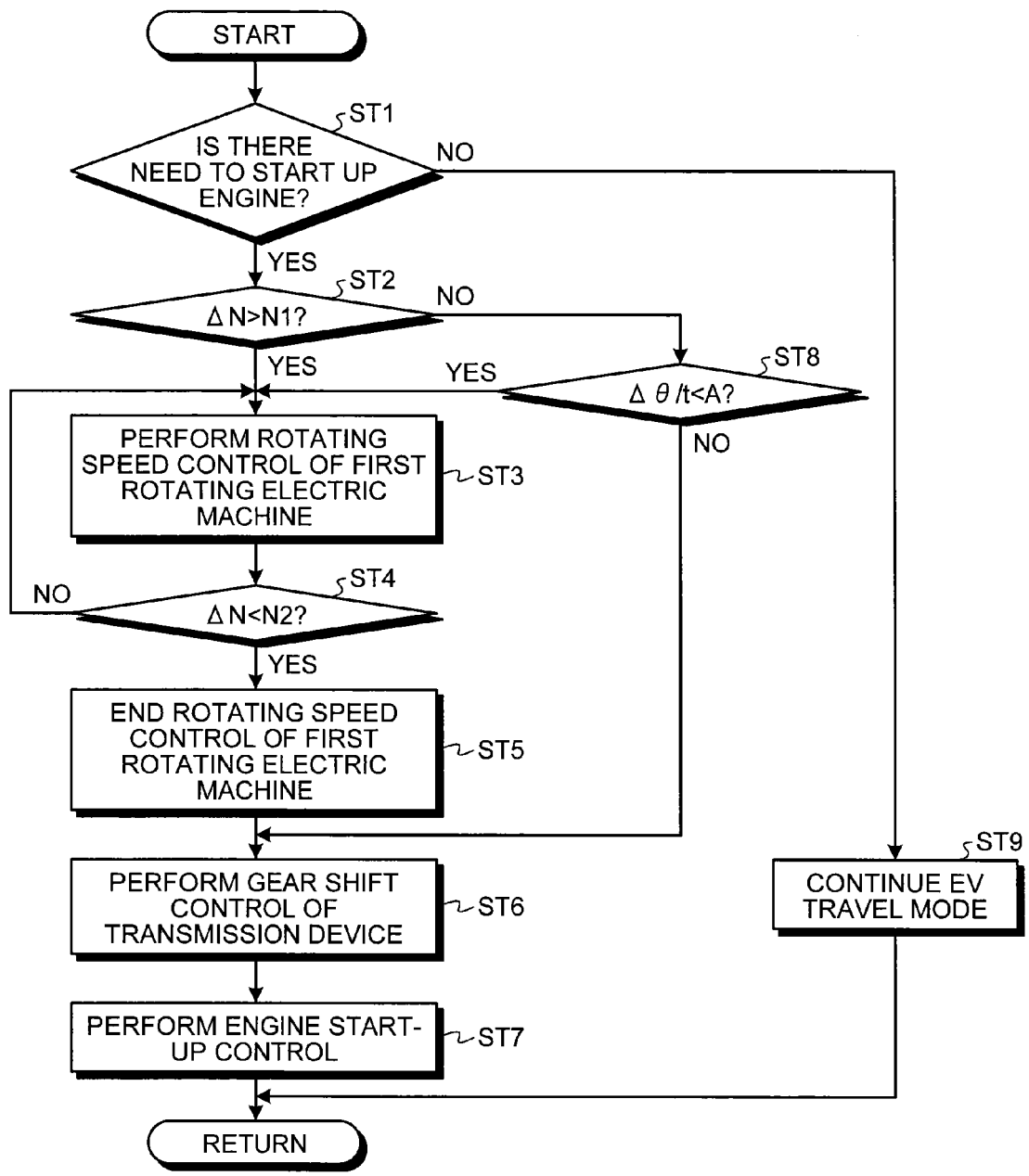
FIG. 11 is a flowchart illustrating an operation when an engine is started up in an EV travel mode of the embodiment.

Hereinafter, a calculation operation when the engine ENG is started up in the EV travel mode will be described with reference to the flowchart of FIG. 11 and the time chart of FIG. 12.

Figure 12:
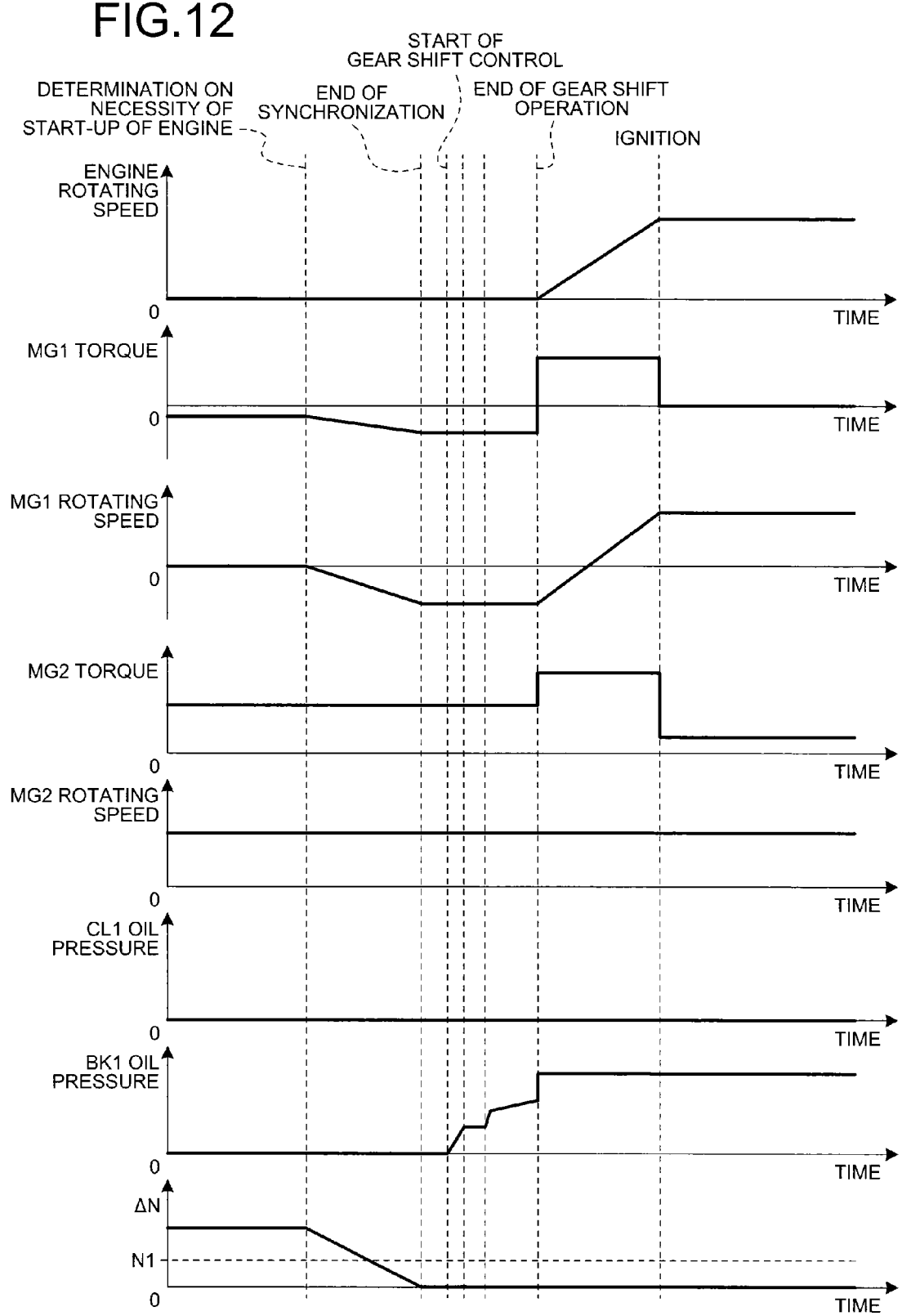
FIG. 12 is a time chart illustrating an operation when an engine is started up in an EV travel mode of the embodiment.

As illustrated in the time chart of FIG. 12, the hybrid vehicle 100 of the example travels in the single motor EV mode in which the power of the second rotating electric machine MG2 is used and the transmission device 20 is in the neutral state since only the second rotating electric machine MG2 outputs a positive MG2 torque by the normal rotation and the control oil pressure (the CL1 oil pressure) of the clutch CL1 and the control oil pressure (the BK1 oil pressure) of the brake BK1 are zero so that both the clutch CL1 and the brake BK1 are in the release state (the alignment chart of FIG. 4). Furthermore, the first rotating electric machine MG1 generates a negative MG1 torque while the rotating speed thereof is zero so that the reaction force at that time is received.

The HVECU 90 determines whether the engine ENG needs to be started up or not in the EV travel mode (step ST1).

In step ST1, when the switching from the EV travel mode to the HV travel mode is required, it is determined that the start-up of the engine ENG is needed. Meanwhile, when the switching is not required, it is determined that the start-up of the engine ENG is not needed. That is, this determination is based on the accelerator opening degree θ obtained by the driver's accelerator depressing amount or the driver's accelerator operation or the throttle opening degree obtained in response to the drive request in the automatic travel control (in the state where cruise control or the like is performed). Alternatively, this determination is performed based on the required vehicle driving force in response to the accelerator depressing amount or the throttle opening degree. When the HVECU 90 determines that the start-up of the engine ENG is not needed, the routine proceeds to step ST9 so that the EV travel mode is continued.

The HVECU 90 sets the target gear shift stage of the transmission device 20 after the start-up of the engine (after the switching of the travel mode) by using the value (the accelerator depressing amount or the required vehicle driving force) used in the determination of step ST1. This setting may be performed along with, for example, the determination of step ST1. The time chart of FIG. 12 illustrates an example in which the single motor EV mode (the alignment chart of FIG. 4) is switched to the HV high mode (the alignment chart of FIG. 6). For this reason, in this example, the brake BK1 becomes the engagement control target when the transmission device 20 is shifted to the target gear shift stage.

Furthermore, the target gear shift stage which is set herein is temporarily set, and hence there is a case in which the target gear shift stage may be changed in response to the accelerator opening degree change rate Δθ/t below. For example, when the accelerator opening degree change rate Δθ/t is small, the accelerator opening degree θ does not increase largely compared to the initial setting of the target gear shift stage. Accordingly, there is a low possibility that the required vehicle driving force may largely increase compared to the case of the determination on whether to start up the engine ENG or not. On the contrary, when the accelerator opening degree change rate Δθ/t is large, the accelerator opening degree θ largely increases compared to the initial setting of the target gear shift stage. Accordingly, there is a high possibility that the required vehicle driving force may largely increase compared to the case of the determination on whether to start up the engine ENG or not. Then, for example, in the case of the switching of the arrow a of FIG. 9, the required vehicle driving force largely increases compared to the current value, and hence there is a case in which the target gear shift stage of the transmission device 20 after the start-up of the engine needs to be changed from the high-speed stage of the over-drive state to the low-speed stage of the direct connection state. Therefore, in this example, the target gear shift stage of the transmission device 20 after the start-up of the engine may be determined to be good or bad based on the accelerator opening degree change rate Δθ/t in the state of the determination on whether to start up the engine ENG or not. At that time, it is desirable that the accelerator opening degree change rate Δθ/t be calculated as a recent value from at least the time point of the determination on whether to start up the engine ENG or not.

When the HVECU 90 determines that the engine ENG needs to be started up, it is determined whether the rotating speed difference ΔN of the clutch CL1 or the brake BK1 of the engagement control target in response to the target gear shift stage is larger than a predetermined value N1 (step ST2). There is a high possibility that the degradation in durability or the gear shift shock of the clutch CL1 or the brake BK1 of the release state is caused by the engagement operation thereof as the rotating speed difference ΔN increases. In step ST2, it is determined whether there is a concern that the gear shift shock or the degradation in durability of the clutch CL1 or the brake BK1 may be caused when the clutch CL1 or the brake BK1 is engaged at the current rotating speed difference ΔN. In another method, step ST2 is used to determine whether the clutch CL1 or the brake BK1 may be engaged at the current rotating speed difference ΔN, that is, the transmission device 20 may be shifted to the target gear shift stage at the current state of the clutch CL1 or the brake BK1. Accordingly, the predetermined value N1 may be set to a maximum value of the rotating speed difference ΔN at which no problem occurs from the viewpoint of the durability or the gear shift shock even when the engagement is performed even in the current state or a maximum value with a correction value. The correction value is used to count in the detection error or the like of the rotating speed difference ΔN. Furthermore, the state where no problem arises indicates a state where the degradation in durability or the gear shift shock does not occur or a state where the degradation in durability or the gear shift shock is generated within an allowable range. In the time chart of FIG. 12, since the brake BK1 becomes the engagement control target, the determination is performed by the comparison with the rotating speed difference ΔN of the brake BK1.

When the HVECU 90 determines that the rotating speed difference ΔN is larger than the predetermined value N1, the rotating speed of the first rotating electric machine MG1 is controlled so that the rotating speed difference ΔN becomes smaller than the current value (step ST3). In the configuration of the example, the rotating speed of the first rotating electric machine MG1 is decreased. The control of decreasing the rotating speed of the first rotating electric machine MG1 is used to suppress the degradation in durability caused by the engagement of the clutch CL1 or the brake BK1 of the engagement control target in response to the target gear shift stage and to suppress the gear shift shock caused by the engagement of the clutch CL1 or the brake BK1. Accordingly, the rotating speed of the first rotating electric machine MG1 may be controlled so that the rotating speed difference ΔN becomes at least the predetermined value N1 or less. More desirably, the rotating speed of the first rotating electric machine MG1 may be controlled so that the rotating speed difference ΔN becomes zero or a small rotating speed difference N2 (<N1) of almost zero. That is, step ST3 is the control of decreasing the rotating speed difference ΔN. Here, the small rotating speed difference N2 is set as a predetermined value, and the control of decreasing the rotating speed of the first rotating electric machine MG1 is performed so that the rotating speed difference ΔN becomes smaller than the predetermined value N2. When the rotating speed difference ΔN is controlled at zero or almost zero, the durability can be greatly improved and the gear shift shock can be substantially eliminated.

The time chart of FIG. 12 illustrates a case where the rotating speed difference ΔN of the brake BK1 becomes larger than the predetermined value N1. In this example, the control of decreasing the rotating speed of the first rotating electric machine MG1 is performed so that the rotating speed difference ΔN becomes smaller than the predetermined value N2, and hence the rotating speed of the first engagement member and the rotating speed of the second engagement member of the brake BK1 are synchronized. The control of decreasing the rotating speed of the first rotating electric machine MG1 is started at substantially the same time as the determination on whether to start up the engine ENG. Specifically, the rotating speed of the first rotating electric machine MG1 is decreased in the reverse rotation direction and the negative MG1 torque is increased so as to decrease the rotating speed difference ΔN of the brake BK1.

The HVECU 90 determines whether the rotating speed difference ΔN is smaller than the predetermined value N2 (step ST4).

The HVECU 90 continues the control of decreasing the rotating speed of the first rotating electric machine MG1 of step ST3 when the rotating speed difference ΔN does not become smaller than the predetermined value N2.

When the HVECU 90 determines that the rotating speed difference ΔN is smaller than the predetermined value N2, the control of decreasing the rotating speed difference ΔN is ended (step ST5). In step ST5, the control of the first rotating electric machine MG1 is performed so that the rotating speed and the MG1 torque at the determination are maintained. That is, in step ST5, the control of decreasing the rotating speed of the first rotating electric machine MG1 for decreasing the rotating speed difference ΔN is ended. When the rotating speed difference ΔN decreases and the rotating speed of the first engagement member and the rotating speed of the second engagement member are completely synchronized with each other, the dual motor EV mode illustrated in the alignment chart of FIG. 5 is selected, and hence the EV travel mode is still continued.

Subsequently, the HVECU 90 performs the gear shift operation to the target gear shift stage of the transmission device 20 (step ST6). In step ST6, control is performed so that any one of the clutch CL1 and the brake BK1 becomes the engagement state based on the target gear shift stage. In the time chart of FIG. 12, since the gear shift operation is performed from the neutral state to the over-drive state, the gear shift control of the transmission device 20 is started by starting an increase in the BK1 oil pressure. At that time, since the engagement members of the brake BK1 are actually engaged when the BK1 oil pressure exceeds a predetermined value, the gear shift operation of the transmission device 20 is actually started along with the engagement operation. The BK1 oil pressure is increased until the brake BK1 becomes the full engagement state.

The HVECU 90 ends the start-up control of the engine ENG when the clutch CL1 or the brake BK1 becomes the full engagement state and the gear shift operation of the transmission device 20 to the target gear shift stage is completed (step ST7). In step ST7, the rotating speed of the first rotating electric machine MG1 is controlled again so as to increase the rotating speed of the stopped engine ENG, and the start-up control of the engine ENG is performed when the rotating speed of the engine ENG increases to the rotating speed enabling the ignition by the rotation of the first rotating electric machine MG1. At that time, the HVECU 90 takes the reaction force by the first rotating electric machine MG1 in accordance with an increase in the rotating speed of the engine ENG. Further, the HVECU 90 causes the second rotating electric machine MG2 to receive the reaction force so that any change in torque does not occur in the output component (for example, the drive wheel W or the ring gear R2 of the differential device 30).

Figure 13:
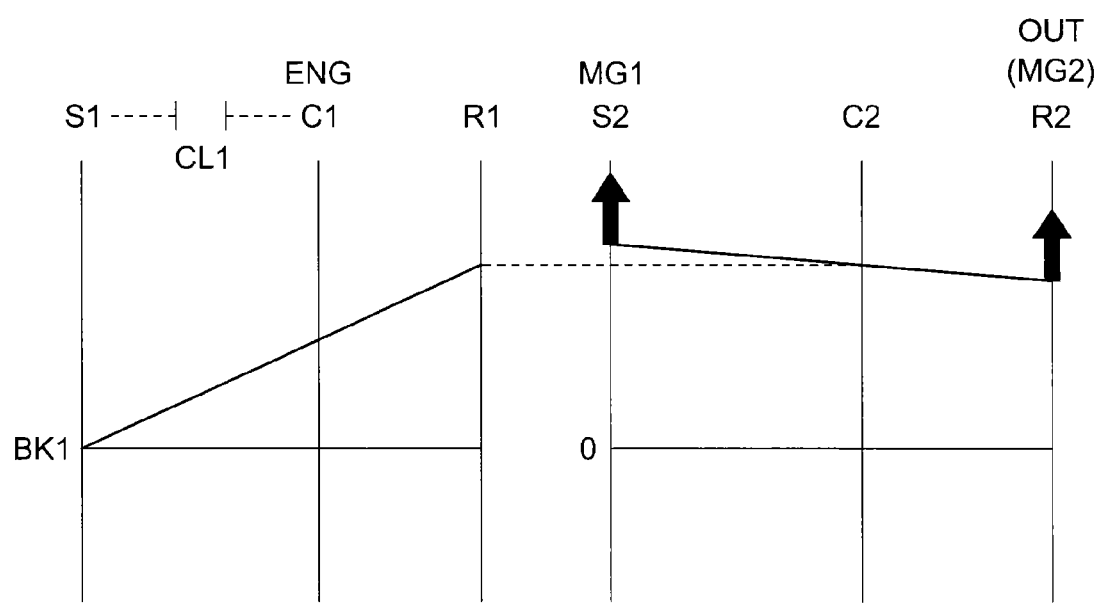
FIG. 13 is an alignment chart when the engine rotating speed is increased by a rotation of a first rotating electric machine.

In the time chart of FIG. 12, when the gear shift operation of the transmission device 20 is completed, the rotating speed of the first rotating electric machine MG1 is increased by switching the rotation direction of the first rotating electric machine MG1 rotating reversely when the gear shift operation is completed to the normal rotation direction, and the rotation is transmitted to the engine rotation shaft 11 through the differential device 30 and the transmission device 20 so as to increase the rotating speed of the engine ENG. FIG. 13 illustrates the alignment chart when the rotating speed of the engine ENG is increased by the rotation of the first rotating electric machine MG1. Since this state is the HV high mode, the brake BK1 is in the engagement state. In the increasing state, the first rotating electric machine MG1 outputs the positive MG1 torque and the positive MG2 torque is increased by the amount of the reaction force so that the first rotating electric machine MG1 and the second rotating electric machine MG2 take the reaction force. Subsequently, when the engine rotating speed increases to a predetermined rotating speed enabling the ignition, the HVECU 90 ignites the engine ENG and adjusts the MG1 torque and the MG2 torque so that a change in the vehicle driving force caused by the generation of the engine torque can be suppressed. Here, the MG1 rotating speed is stopped at the rotating speed during the ignition of the engine, the MG1 torque is decreased to zero, and the MG2 torque of the second rotating electric machine MG2 is decreased at the positive value.

Further, when the HVECU 90 determines that the rotating speed difference ΔN is the predetermined value N1 or less in step ST2, it is determined whether the accelerator opening degree change rate Δθ/t is smaller than a predetermined value A (step ST8). In step ST8, it is determined whether sudden acceleration is required or not. Here, when the accelerator opening degree change rate Δθ/t is smaller than the predetermined value A, it is determined that the sudden acceleration is not required. Meanwhile, when the accelerator opening degree change rate Δθ/t is the predetermined value A or more, it is determined that the sudden acceleration is required. The predetermined value A may be set as a minimum value of the accelerator opening degree change rate Δθ/t at which the acceleration is started due to the sudden acceleration or a minimum value with a correction value. The correction value is obtained by counting in the detection error or the like of the accelerator opening degree change rate Δθ/t. Further, the correction value may be set as a value smaller than the minimum value if the sudden acceleration needs to be easily determined or may be set as a value larger than the minimum value if the sudden acceleration does not need to be easily determined. Furthermore, the state of the sudden acceleration changes depending on the feeling or the taste of the driver. For this reason, it is desirable that the predetermined value A be appropriately set, for example, depending on the feeling or the taste of the vehicle buyer. In step ST8, the determination may be performed by the accelerator stepping speed or the throttle valve opening degree change rate instead of the accelerator opening degree change rate Δθ/t.

Here, when it is determined that the accelerator opening degree change rate Δθ/t is smaller than the predetermined value A, the responsiveness of the switching from the EV travel mode to the HV travel mode is not demanded as the sudden acceleration is required. For this reason, in this case, the routine proceeds to step ST3 so as to decrease the rotating speed difference ΔN, and the gear shift control of the transmission device 20 or the start-up control of the engine ENG is performed. That is, in this case, there is a low possibility that the gear shift shock or the degradation in durability of the clutch CL1 or the brake BK1 is caused by the engagement control. However, the control of decreasing the rotating speed difference ΔN is performed in order to further suppress the degradation in durability or the gear shift shock, and then the gear shift control of the transmission device 20 or the start-up control of the engine ENG is performed.

On the contrary, when it is determined that the accelerator opening degree change rate Δθ/t is the predetermined value A or more, the driver requires the sudden acceleration. Further, when it is determined that the throttle opening degree change rate is a predetermined value (corresponding to the predetermined value A) or more during the automatic travel control (the cruise control or the like), sudden acceleration is required from the vehicle. Then, when the sudden acceleration is required, it is desirable to promptly complete the switching from the EV travel mode to the HV travel mode even when the gear shift shock is slightly generated compared to the case where the sudden acceleration is not required. Accordingly, when the sudden acceleration is required, the HVECU 90 causes the routine to proceed to step ST6 so as to perform the gear shift operation to the target gear shift stage of the transmission device 20, and causes the routine to proceed to step ST7 so as to perform the start-up control of the engine ENG.

In this way, in the hybrid system 1-1 and the power transmission device, when the rotating speed difference ΔN of the clutch CL1 or the brake BK1 of the engagement control target in response to the target gear shift stage is large, the rotating speed difference ΔN is decreased by the control of decreasing the rotating speed of the first rotating electric machine MG1 regardless of the request of the sudden acceleration, and the gear shift control to the target gear shift stage of the transmission device 20 and the start-up control of the engine ENG are performed. Further, in the hybrid system 1-1 and the power transmission device, even when the rotating speed difference ΔN is small and the sudden acceleration is not required, the rotating speed difference ΔN is decreased by the control of decreasing the rotating speed of the first rotating electric machine MG1, and the gear shift control to the target gear shift stage of the transmission device 20 and the start-up control of the engine ENG are performed. Accordingly, the hybrid system 1-1 and the power transmission device can prevent degradation in durability caused by the engagement of the clutch CL1 or the brake BK1 of the engagement control target, and can suppress the gear shift shock caused by the engagement of the clutch CL1 or the brake BK1 so that the gear shift shock is small. Accordingly, since the hybrid system 1-1 and the power transmission device can simplify the countermeasure (the adjustment of the value or the output time of the CL1 oil pressure or the BK1 oil pressure) for the degradation in durability or the gear shift shock when the clutch CL1 or the brake BK1 of the engagement control target is engaged, the engagement control of the clutch CL1 or the brake BK1 can be easily performed.

Further, in the hybrid system 1-1 and the power transmission device, since the gear shift control to the target gear shift stage of the transmission device 20 and the start-up control of the engine ENG are performed without performing the control of decreasing the rotating speed difference ΔN when the rotating speed difference ΔN is small and the sudden acceleration is required, it is possible to switch the EV travel mode to the HV travel mode with high responsiveness compared to the case where the control of decreasing the rotating speed difference ΔN is performed. That is, in this case, the hybrid system 1-1 and the power transmission device can promptly switch the EV travel mode to the HV travel mode even when the gear shift shock is slightly generated. Accordingly, the hybrid system 1-1 and the power transmission device can accelerate the hybrid vehicle 100 at the initial acceleration in response to the request of the sudden acceleration compared to the case where the control of decreasing the rotating speed difference ΔN is performed.

FIRST MODIFIED EXAMPLE

In the above-described embodiment, the control of decreasing the rotating speed difference ΔN is performed by the control of decreasing the rotating speed of the first rotating electric machine MG1, and the gear shift operation of the transmission device 20 is performed. Then, when the transmission device 20 becomes the power transmission state, the engine rotating speed is increased again by the control of increasing the rotating speed of the first rotating electric machine MG1. At that time, as understood from the sequence of the alignment charts of FIGS. 4, 5, and 13, the first rotating electric machine MG1 is first rotated reversely so that the rotating speed decreases for the control of decreasing the rotating speed difference ΔN, and is rotated normally so that the rotating speed increases for the engine start-up control. For this reason, when the control of decreasing the rotating speed difference ΔN is performed, there is a possibility that the responsiveness until the completion of the start-up of the engine can be degraded compared to the case where the decreasing control is not performed. The delay of the responsiveness of the start-up of the engine can be easily generated as the rotating speed difference ΔN increases.

Therefore, the HVECU 90 of the modified example simultaneously performs the control of decreasing the rotating speed difference ΔN by the control of decreasing the rotating speed of the first rotating electric machine MG1 decreasing control and the gear shift control of the transmission device 20.

Here, the parallel process including the control of decreasing the rotating speed difference ΔN and the gear shift control of the transmission device 20 is useful to improve the responsiveness until the completion of the start-up of the engine. However, since the clutch CL1 or the brake BK1 of the engagement control target in response to the target gear shift stage may start to be engaged before the rotating speed difference ΔN decreases to the target rotating speed difference, there is a possibility that the gear shift shock may be generated. Therefore, in the modified example, the parallel process may be determined from the viewpoint of solving any one of the delay of the responsiveness of the start-up of the engine and the gear shift shock in consideration of the comparison result thereof.

Figure 14:
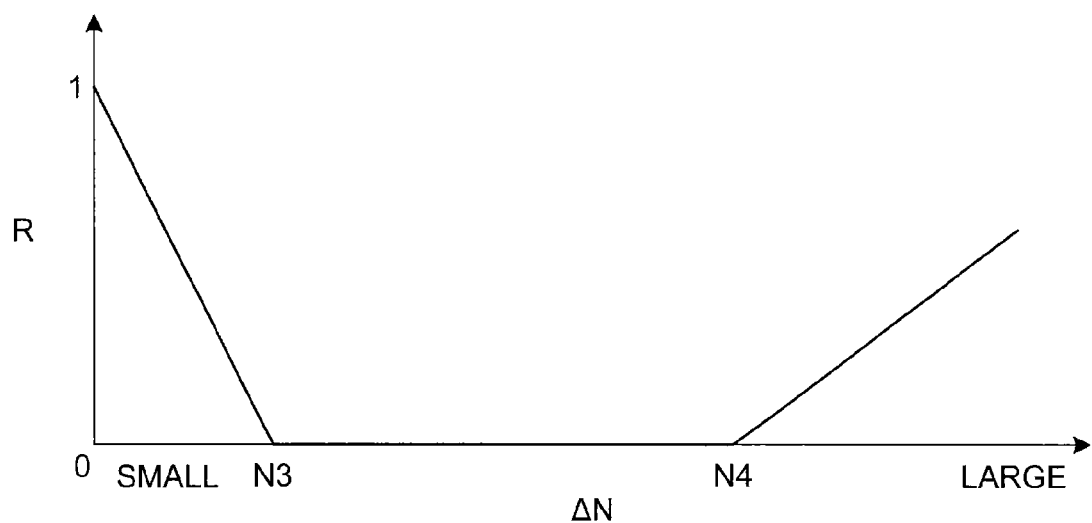
FIG. 14 is a diagram illustrating an operation rate of rotating speed difference decreasing control when a parallel process including rotating speed difference decreasing control and gear shift control of a transmission device is performed.

FIG. 14 illustrates the operation rate R of the control of decreasing the rotating speed difference ΔN when the parallel process is performed. The operation rate R can be obtained from, for example, the following equation 1 by using the torque capacity T1 of the clutch CL1 or the brake BK1 of the engagement control target and the rotation synchronization torque T2 for the control of decreasing the rotating speed of the first rotating electric machine MG1.

$$R = T1/(T1+T2) \quad (1)$$

In this example, as illustrated in FIG. 14, the parallel process is not performed by setting the operation rate R to zero in the range of the rotating speed difference N3 and the rotating speed difference N4. In the range in which the parallel process is not performed, the gear shift control of the transmission device 20 is performed after the completion of the control of decreasing the rotating speed difference ΔN. The range in which the parallel process is not performed is obtained by an experiment or a simulation based on the degree of the gear shift shock or the responsiveness of the start-up of the engine ENG. For example, in the range (particularly, the rotating speed difference N3 and the rotating speed difference N4) in which the parallel process is not performed, the rotating speed difference ΔN at which the gear shift shock needs to be first suppressed compared to the delay of the responsiveness of the start-up of the engine or a value with a correction value in the rotating speed difference ΔN may be set. The correction value is used to count in the detection error or the like of the rotating speed difference ΔN.

In this example, the rotating speed difference N3 is set as a predetermined value (a first threshold value). When the rotating speed difference ΔN is smaller than the predetermined value N3, the parallel process is performed by increasing the operation rate R compared to the range in which the parallel process is not performed so as to solve the delay of the responsiveness of the start-up of the engine. This is because the gear shift shock hardly occurs as the rotating speed difference ΔN decreases. The operation rate R at this time increases as the rotating speed difference ΔN decreases since the gear shift shock decreases as the rotating speed difference ΔN decreases. That is, in the modified example, the parallel process is easily performed as the rotating speed difference ΔN decreases.

Further, in this example, the rotating speed difference N4 is set as a predetermined value (a second threshold value). When the rotating speed difference ΔN is larger than the predetermined value N4, the parallel process is performed by increasing the operation rate R compared to the range in which the parallel process is not performed so as to solve the responsiveness of the delay of the start-up of the engine. This is because the responsiveness until the completion of the start-up of the engine is degraded as the rotating speed difference ΔN increases. The operation rate R at this time increases as the rotating speed difference ΔN increases since the delay of the responsiveness of the start-up of the engine increases as the rotating speed difference ΔN increases. That is, in the modified example, a parallel process can be easily performed as the rotating speed difference ΔN increases.

SECOND MODIFIED EXAMPLE

Figure 15:
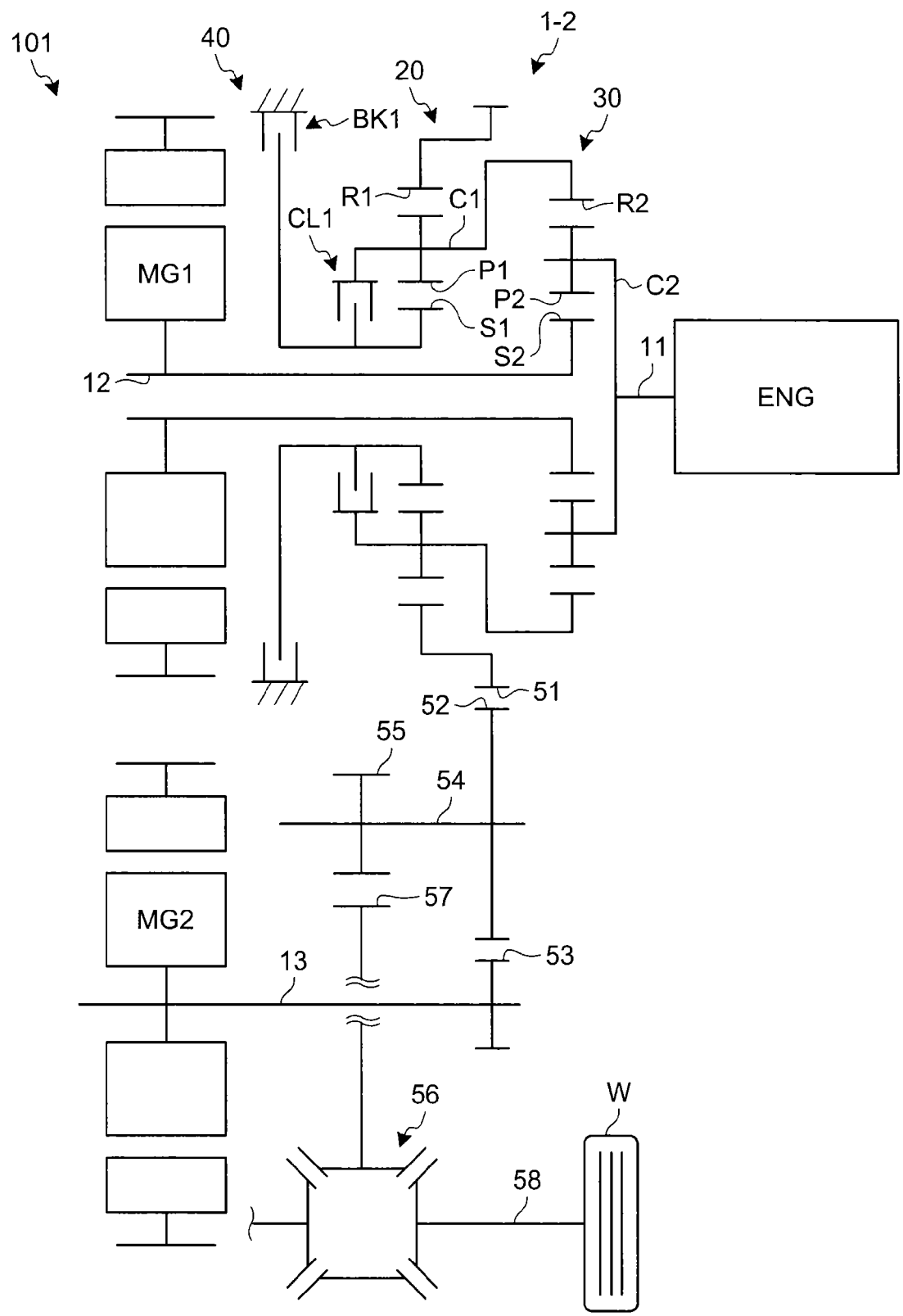
FIG. 15 is a skeleton diagram illustrating the configurations of a power transmission device for a hybrid vehicle and a hybrid system of a second modified example.

The techniques of the above-described embodiment and the first modified example can be also applied to a hybrid system 1-2 illustrated in FIG. 15 below, and the same effect as those of the embodiment and the first modified example can be obtained. Reference Sign 101 of FIG. 15 indicates the hybrid vehicle equipped with the hybrid system 1-2.

Similarly to the hybrid system 1-1, the hybrid system 1-2 includes the engine ENG, the first rotating electric machine MG1, and the second rotating electric machine MG2 as the power sources, and further includes a power transmission device including the transmission device 20, the differential device 30, and the gear shift adjustment device 40. The power sources are the same as those of the hybrid system 1-1. Meanwhile, the power transmission device has a difference in configuration as below with respect to the power transmission device of the hybrid system 1-1.

The power transmission device of the hybrid system 1-2 has a different configuration in that the arrangement and the connection form of the transmission device 20 and the differential device 30 connected in series to each other are different.

The transmission device 20 includes a planetary gear mechanism (specifically, a single pinion type planetary gear mechanism) with a plurality of rotation component capable of performing a differential rotation thereof. Even in this example, the sun gear S1 is connected to the brake BK1 of the gear shift adjustment device 40. Further, even in this example, the clutch CL1 of the gear shift adjustment device 40 is interposed between the sun gear S1 and the carrier C1.

Here, in the hybrid system 1-2, the carrier C1 is connected to the differential device 30, and serves as a second power transmission component which transmits power to the differential device 30. In the hybrid system 1-2, since the engine ENG is connected to the differential device 30, the carrier C1 also serves as a first power transmission component which transmits power from the engine ENG. Further, in the hybrid system 1-2, the ring gear R1 of the transmission device 20 serves as the output component of the power transmission device including the transmission device 20 and the differential device 30, and is connected to the second rotating electric machine MG2 and the drive wheel W through the counter drive gear 51 or the like. The ring gear R1 rotates along with the counter drive gear 51.

The differential device 30 includes a planetary gear mechanism (specifically, a single pinion type planetary gear mechanism) with a plurality of rotation components capable of performing a differential operation thereof. Even in this example, the sun gear S2 is connected to the MG1 rotation shaft 12.

Here, in the hybrid system 1-2, the carrier C2 is connected to the engine ENG, and hence the carrier C2 and the engine rotation shaft 11 can be rotated together. Further, in the hybrid system 1-2, the ring gear R2 is connected to the carrier C1 of the transmission device 20, and hence the ring gear R2 and the carrier C1 can be rotated together.

The operation engagement table of the hybrid system 1-2 is the same as that of FIG. 3.

[Single Motor EV Mode]

When the secondary battery can be charged, both the clutch CL1 and the brake BK1 are released so that the transmission device 20 is controlled in the neutral state. In the single motor EV mode (without needing the engine brake), since the regeneration power can be obtained without using the engine brake similarly to the hybrid system 1-1, the fuel economy (the electric economy) can be improved. Meanwhile, when the charging of the secondary battery is prohibited, only one of the clutch CL1 and the brake BK1 is engaged so as to rotate the engine ENG, and the engine brake is generated. Even in this case, the HVECU 90 increases the engine rotating speed by the control of the first rotating electric machine MG1 similarly to the hybrid system 1-1.

When the secondary battery can be charged in the backward movement mode, the vehicle may travel by using the power of only the second rotating electric machine MG2 while both the clutch CL1 and the brake BK1 are released or the vehicle may travel by using the power of both the first rotating electric machine MG1 and the second rotating electric machine MG2 while both the clutch CL1 and the brake BK1 are engaged and the carrier C1 of the transmission device 20 is fixed.

[HV Travel Mode]

Similarly to the hybrid system 1-1, the hybrid system 1-2 separately uses the HV high mode and the HV low mode in response to the vehicle speed. Thus, since two mechanical points exist even in the hybrid system 1-2, it is possible to improve the transmission efficiency when the transmission device is operated in the high gear state in the HV travel mode, and hence to improve the fuel economy when the vehicle travels at the high vehicle speed.

In the HV high mode, the transmission device 20 is switched to the high speed stage by the release of the clutch CL1 and the engagement of the brake BK1 so that the rotation of the engine ENG is output while the rotation speed thereof increases. Meanwhile, in the HV low mode, the transmission device 20 is switched to the low speed stage by the engagement of the clutch CL1 and the release of the brake BK1 so that the rotation of the engine ENG is output at the constant rotation speed. Even in the hybrid system 1-2, cooperative gear shift control of simultaneously shifting the transmission device 20 and the differential device 30 is performed in order to switch the HV high mode and the HV low mode. Thus, the hybrid system 1-2 can operate the electric continuously variable transmission of which the system transmission gear ratio is continuously changed by the electric control of the rotation of the first rotating electric machine MG1.

When the vehicle moves backward, the first rotating electric machine MG1 is operated as the generator and the second rotating electric machine MG2 is operated as the electric motor in the HV low mode, so that the second rotating electric machine MG2 is rotated in a direction opposite to the forward moving direction.

Incidentally, in the above-described embodiment and the first to second modified examples, the two-stage transmission device 20 is exemplified, but the transmission device 20 may have a gear stage of three stages or more or a continuously variable transmission. In the case of a stepped transmission, the transmission device 20 may have a configuration, for example, in which a plurality of gear stages are formed by the combination of the plurality of planetary gear mechanisms and the engagement device (the brake or the clutch) or may be a so-called general stepped automatic transmission. In the case of the continuously variable transmission, the transmission device 20 may be of, for example, a belt type or a ball planetary type. The transmission device 20 may be of any type of the above-described examples, and the input and output shafts thereof serve as a first power transmission component and a second power transmission component.

Further, in the above-described embodiment and the first to second modified examples, the hybrid vehicles 100 and 101 that charge the batteries thereof by the regeneration operation using the power of the engine ENG have been described, but the techniques described in the embodiment and the first to second modified examples may be also applied to a plug-in hybrid vehicle that can charge a battery thereof by an external power supply.

REFERENCE SIGNS LIST

1-1, 1-2 HYBRID SYSTEM
11 ENGINE ROTATION SHAFT
12 MG1 ROTATION SHAFT
13 MG2 ROTATION SHAFT
20 TRANSMISSION DEVICE
21 ROTATION SHAFT
30 DIFFERENTIAL DEVICE
40 GEAR SHIFT ADJUSTMENT DEVICE
100, 101 HYBRID VEHICLE
90 HVECU (INTEGRATED ECU)
91 ENGINE ECU
92 MGECU
BK1 BRAKE
CL1 CLUTCH
C1, C2 CARRIER
ENG ENGINE
MG1 FIRST ROTATING ELECTRIC MACHINE
MG2 SECOND ROTATING ELECTRIC MACHINE
P1, P2 PINION GEAR
R1, R2 RING GEAR
S1, S2 SUN GEAR
W DRIVE WHEEL

The invention claimed is:

1. A power transmission device for a hybrid vehicle, comprising:
   a first planetary gear mechanism including a first rotation shaft to which a rotation shaft of an engine is connected;
   a second planetary gear mechanism including a plurality of rotation components which perform differential rotation and individually connected to a second rotation shaft of the first planetary gear mechanism, a rotation shaft of a first rotating electric machine, a rotation shaft of a second rotating electric machine, and a drive wheel;

a clutch;
a brake; and
a controller,
wherein the clutch is configured:
to connect a sun gear of the first planetary gear mechanism to a carrier of the first planetary gear mechanism when the clutch is in an engagement state; and
to separate the sun gear of the first planetary gear mechanism from the carrier of the first planetary gear mechanism when the clutch is in a release state,
the brake is configured:
to regulate rotation of the sun gear of the first planetary gear mechanism when the brake is in an engagement state; and
to allow the rotation of the sun gear of the first planetary gear mechanism when the brake is in a release state,
the controller switches the first planetary gear mechanism to a neutral state where transmission of power between the first rotation shaft and the second rotation shaft is not allowed when both of the clutch and the brake are in the release state or to a state where the transmission of power between the first rotation shaft and the second rotation shaft is allowed when any one of the clutch and the brake is in the engagement state,
the controller is programmed to output in a first step an instruction to the first rotating electric machine to decrease a rotating speed of the first rotating electric machine in a case where a rotating speed difference between engagement members of the clutch or a rotating speed difference between engagement members of the brake is smaller than or equal to a predetermined rotating speed difference and an accelerator opening degree change rate is smaller than a predetermined value, or the rotating speed difference is larger than the predetermined rotating speed difference, to output in a second step an instruction to the clutch and the brake to bring any one of the clutch and the brake into the engagement state and to switch the first planetary gear mechanism in the neutral state to the state where the transmission of power between the first rotation shaft and the second rotation shaft is allowed, and to output in a third step an instruction to the first rotating electric machine to increase the rotating speed of the first rotating electric machine, when the engine is started up during an EV travel mode performed by transmitting the power of at least one of the first and second rotating electric machines to the drive wheel,
the controller does not perform the first step and performs the second and the third steps in a case where the rotating speed difference between the engagement members of the clutch or the rotating speed difference between the engagement members of the brake is smaller than or equal to the predetermined rotating speed difference and the accelerator opening degree change rate is larger than or equal to the predetermined value, when the engine is started up in the EV travel mode,
the controller performs the first and second steps in parallel, when the rotating speed difference between the engagement members of the clutch or the rotating speed difference between the engagement members of the brake is larger than a second predetermined value.

2. A power transmission device for a hybrid vehicle, comprising:
a second planetary gear mechanism including a plurality of rotation components which perform differential rotation, a first rotation component to which a rotation shaft of an engine is connected, and a second rotation component to which a rotation shaft of a first rotating electric machine is connected;
a first planetary gear mechanism including a first rotation shaft to which a third rotation component of the second planetary gear mechanism is connected and a second rotation shaft to which a rotation shaft of a second rotating electric machine and a drive wheel are connected;
a clutch;
a brake; and
a controller,
wherein the clutch is configured:
to connect a sun gear of the first planetary gear mechanism to a carrier of the first planetary gear mechanism when the clutch is in an engagement state; and
to separate the sun gear of the first planetary gear mechanism from the carrier of the first planetary gear mechanism when the clutch is in a release state,
the brake is configured:
to regulate rotation of the sun gear of the first planetary gear mechanism when the brake is in an engagement state; and
to allow the rotation of the sun gear of the first planetary gear mechanism when the brake is in a release state,
the controller switches the first planetary gear mechanism to a neutral state where transmission of power between the first rotation shaft and the second rotation shaft is not allowed when both of the clutch and the brake are in the release state or to a state where the transmission of power between the first rotation shaft and the second rotation shaft is allowed when any one of the clutch and the brake is in the engagement state,
the controller is programmed to output in a first step an instruction to the first rotating electric machine to decrease a rotating speed of the first rotating electric machine in a case where a rotating speed difference between engagement members of the clutch or a rotating speed difference between engagement members of the brake is smaller than or equal to a predetermined rotating speed difference and an accelerator opening degree change rate is smaller than a predetermined value, or the rotating speed difference is larger than the predetermined rotating speed difference, to output in a second step an instruction to the clutch and the brake to bring any one of the clutch and the brake into the engagement state and to switch the first planetary gear mechanism in the neutral state to the state where the transmission of power between the first rotation shaft and the second rotation shaft is allowed, and to output in a third step an instruction to the first rotating machine to increase the rotating speed of the first rotating electric machine, when the engine is started up in an EV travel mode performed by transmitting the power of at least one of the first and second rotating electric machines to the drive wheel,
the controller does not perform the first step and performs the second and the third steps in a case where the rotating speed difference between the engagement members of the clutch or the rotating speed difference between the engagement members of the brake is smaller than or equal to the predetermined rotating speed difference and the accelerator opening degree change rate is larger than or equal to the predetermined value when the engine is started up in the EV travel mode, the controller performs the first and second steps in parallel, when the rotating speed difference between the engagement members of the clutch or the rotating speed difference between the engagement members of the brake is larger than a second predetermined value.

3. The power transmission device for a hybrid vehicle according to claim 1, wherein when the rotating speed difference between the engagement members of the clutch or the rotating speed difference between the engagement members of the brake is smaller than a first predetermined value, the first and second steps are performed in parallel.

4. The power transmission device for a hybrid vehicle according to claim 3, wherein when the rotating speed difference between the engagement members of the clutch or the rotating speed difference between the engagement members of the brake is smaller than a first predetermined value, the first and second steps are performed in parallel.

5. The power transmission device for a hybrid vehicle according to claim 3, wherein performance of the parallel process including the first and second steps improves as the rotating speed difference decreases.

6. The power transmission device for a hybrid vehicle according to claim 1, wherein performance of the parallel process including the first and second steps improves as the rotating speed difference increases.

* * * * *